United States Patent
Cathey, Jr. et al.

(10) Patent No.: US 7,218,448 B1
(45) Date of Patent: *May 15, 2007

(54) EXTENDED DEPTH OF FIELD OPTICAL SYSTEMS

(75) Inventors: Wade Thomas Cathey, Jr., Boulder, CO (US); Edward Raymond Dowski, Jr., Lafayette, CO (US)

(73) Assignee: The Regents of the University of Colorado, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/070,969

(22) Filed: May 1, 1998

Related U.S. Application Data

(63) Continuation-in-part of application No. 08/823,894, filed on Mar. 17, 1997, now Pat. No. 5,748,371.

(51) Int. Cl.
G02B 5/18 (2006.01)
G06K 9/40 (2006.01)

(52) U.S. Cl. .................... 359/558; 382/254

(58) Field of Classification Search ............. 359/558, 359/565, 566, 569, 707, 556; 386/124.5; 382/212, 213, 210, 211, 284, 265, 260, 100, 382/254; 235/462

See application file for complete search history.

(56) References Cited

U.S. PATENT DOCUMENTS

| | | |
|---|---|---|
| 2,959,105 A | 11/1960 | Sayanagi |
| 3,054,898 A | 9/1962 | Westover et al. |
| 3,305,294 A | 2/1967 | Alvarez |
| 3,583,790 A | 6/1971 | Baker |
| 3,614,310 A * | 10/1971 | Korpel |
| 3,856,400 A | 12/1974 | Hartmann et al. |
| 3,873,958 A | 3/1975 | Whitehouse |
| 4,062,619 A | 12/1977 | Hoffman |
| 4,082,431 A | 4/1978 | Ward, III |

(Continued)

FOREIGN PATENT DOCUMENTS

EP 0531926 B1 3/1993

(Continued)

OTHER PUBLICATIONS

"Imaging with Fresnel zone pupil masks:extended depth of field" by Indebetouw et al, Applied Optics, vol. 23 No. 23, p. 4299-4302.*

(Continued)

*Primary Examiner*—Audrey Y. Chang
(74) *Attorney, Agent, or Firm*—Lathrop & Gage LC

(57) ABSTRACT

A system for increasing the depth of field and decreasing the wavelength sensitivity of an incoherent optical system incorporates a special purpose optical mask into the incoherent system. The optical mask has been designed to cause the optical transfer function to remain essentially constant within some range from the in-focus position. Signal processing of the resulting intermediate image undoes the optical transfer modifying effects of the mask, resulting in an in-focus image over an increased depth of field. Generally the mask is placed at or near an aperture stop or image of the aperture stop of the optical system. Preferably, the mask modifies only phase and not amplitude of light, though amplitude may be changed by associated filters or the like. The mask may be used to increase the useful range of passive ranging systems.

10 Claims, 36 Drawing Sheets

U.S. PATENT DOCUMENTS

| | | | |
|---|---|---|---|
| 4,174,885 | A | 11/1979 | Joseph et al. |
| 4,178,090 | A | 12/1979 | Marks et al. |
| 4,255,014 | A | 3/1981 | Ellis |
| 4,275,454 | A | 6/1981 | Klooster, Jr. |
| 4,276,620 | A | 6/1981 | Kahn et al. |
| 4,308,521 | A | 12/1981 | Casasent et al. |
| 4,349,277 | A | 9/1982 | Mundy et al. |
| 4,466,067 | A | 8/1984 | Fontana |
| 4,480,896 | A * | 11/1984 | Kubo et al. ............... 359/707 |
| 4,573,191 | A | 2/1986 | Kidode et al. |
| 4,575,193 | A | 3/1986 | Greivenkamp, Jr. |
| 4,580,882 | A | 4/1986 | Nuchman et al. |
| 4,589,770 | A | 5/1986 | Jones et al. |
| 4,642,112 | A | 2/1987 | Freeman |
| 4,650,292 | A | 3/1987 | Baker et al. |
| 4,655,565 | A | 4/1987 | Freeman |
| 4,725,881 | A | 2/1988 | Buchwald |
| 4,734,702 | A | 3/1988 | Kaplan |
| 4,794,550 | A | 12/1988 | Greivenkamp, Jr. |
| 4,804,249 | A * | 2/1989 | Reynolds et al. ............ 359/721 |
| 4,825,263 | A | 4/1989 | Desjardins et al. |
| 4,827,125 | A | 5/1989 | Goldstein |
| 4,843,631 | A | 6/1989 | Steinpichler et al. |
| 4,936,661 | A | 6/1990 | Betensky et al. |
| 4,964,707 | A | 10/1990 | Hayashi |
| 4,989,959 | A | 2/1991 | Plummer |
| 5,003,166 | A | 3/1991 | Girod |
| 5,076,687 | A | 12/1991 | Adelson |
| 5,102,223 | A | 4/1992 | Uesugi et al. |
| 5,128,874 | A | 7/1992 | Bhanu et al. |
| 5,142,413 | A | 8/1992 | Kelly |
| 5,165,063 | A | 11/1992 | Strater et al. |
| 5,166,818 | A * | 11/1992 | Chase et al. ............... 359/572 |
| 5,193,124 | A | 3/1993 | Subbarao |
| 5,218,471 | A * | 6/1993 | Swanson et al. ............ 359/565 |
| 5,243,351 | A | 9/1993 | Rafanelli et al. |
| 5,248,876 | A | 9/1993 | Kerstens et al. |
| 5,260,727 | A | 11/1993 | Eisner et al. |
| 5,270,825 | A | 12/1993 | Takasugi et al. |
| 5,270,861 | A | 12/1993 | Estelle |
| 5,270,867 | A | 12/1993 | Estelle |
| 5,280,388 | A | 1/1994 | Okayama |
| 5,299,275 | A | 3/1994 | Jackson et al. |
| 5,301,241 | A | 4/1994 | Kirk |
| 5,307,175 | A | 4/1994 | Seachman |
| 5,317,394 | A | 5/1994 | Hale et al. |
| 5,337,181 | A | 8/1994 | Kelly |
| 5,426,521 | A | 6/1995 | Chen et al. |
| 5,438,366 | A | 8/1995 | Jackson et al. |
| 5,442,394 | A | 8/1995 | Lee |
| 5,444,574 | A | 8/1995 | Ono et al. |
| 5,465,147 | A | 11/1995 | Swanson |
| 5,473,473 | A | 12/1995 | Estelle et al. |
| 5,476,515 | A | 12/1995 | Kelman et al. |
| 5,521,695 | A | 5/1996 | Cathey, Jr. et al. |
| 5,532,742 | A | 7/1996 | Kusaka et al. |
| 5,555,129 | A | 9/1996 | Konno et al. |
| 5,565,668 | A | 10/1996 | Reddersen et al. |
| 5,568,197 | A | 10/1996 | Hamano |
| 5,572,359 | A | 11/1996 | Otaki et al. |
| 5,610,684 | A | 3/1997 | Shiraishi |
| 5,640,206 | A | 6/1997 | Kinoshita et al. |
| 5,706,139 | A | 1/1998 | Kelly |
| 5,748,371 | A * | 5/1998 | Cathey, Jr. et al. ......... 359/558 |
| 5,751,475 | A | 5/1998 | Ishiwata et al. |
| 5,756,981 | A * | 5/1998 | Roustaei et al. ............ 235/462 |
| 5,969,853 | A | 10/1999 | Takaoka |
| 5,969,855 | A | 10/1999 | Ishiwata et al. |
| 6,021,005 | A | 2/2000 | Cathey, Jr. et al. |
| 6,025,873 | A | 2/2000 | Nishioka et al. |
| 6,034,814 | A | 3/2000 | Otaki |
| 6,037,579 | A | 3/2000 | Chan et al. |
| 6,069,738 | A | 5/2000 | Cathey, Jr. et al. |
| 6,091,548 | A | 7/2000 | Chen |
| 6,097,856 | A | 8/2000 | Hammond, Jr. |
| 6,121,603 | A | 9/2000 | Hang et al. |
| 6,128,127 | A | 10/2000 | Kusaka |
| 6,144,493 | A | 11/2000 | Okuyama et al. |
| 6,172,723 | B1 | 1/2001 | Inoue et al. |
| 6,172,799 | B1 | 1/2001 | Raj |
| 6,208,451 | B1 | 3/2001 | Itoh |
| 6,218,679 | B1 | 4/2001 | Takahara et al. |
| 6,219,113 | B1 | 4/2001 | Takahara |
| 6,248,988 | B1 | 6/2001 | Krantz |
| 6,285,345 | B1 | 9/2001 | Crossland et al. |
| 6,288,382 | B1 | 9/2001 | Ishihara |
| 6,337,472 | B1 | 1/2002 | Garner et al. |
| 6,525,302 | B2 * | 2/2003 | Dowski et al. ........... 250/201.2 |
| 6,873,733 | B2 * | 3/2005 | Dowski, Jr. ................ 382/232 |
| 6,911,638 | B2 * | 6/2005 | Dowski et al. .......... 250/201.9 |
| 6,940,649 | B2 * | 9/2005 | Dowski, Jr. ................ 359/558 |
| 2003/0173502 | A1 * | 9/2003 | Dowski et al. ............. 250/216 |
| 2004/0145808 | A1 * | 7/2004 | Cathey et al. .............. 359/558 |
| 2005/0264886 | A1 * | 12/2005 | Dowski, Jr. ................ 359/558 |

FOREIGN PATENT DOCUMENTS

| | | |
|---|---|---|
| EP | 0584769 B1 | 3/1994 |
| EP | 0618473 A2 | 10/1994 |
| EP | 0742466 A | 11/1996 |
| EP | 0759573 A2 | 2/1997 |
| EP | 0791846 | 2/1997 |
| EP | 0791846 A2 | 8/1997 |
| EP | 0981245 A2 | 2/2000 |
| GB | 2278750 A | 12/1994 |

OTHER PUBLICATIONS

Cathey, Wade T., and Edward Raymond Dowski, "Extended Depth of Field Optical Systems," International Application published under the Patent Cooperation Treaty, assigned International Application No. PCT/US96/01514 and International Publication No. WO 96/24085.

Published PCT International application No. PCT/US96/01514, publication No. WO 96/24085, entitled, "Extended Depth of Field Optical Systems," filed Feb. 5, 1996, published Aug. 8, 1996.

Bradburn, Sara, Wade Thomas Cathey, and Edward R. Dowski, Jr. "Realizations of Focus Invariance in Optical-Digital Systems with Wave-Front Coding," Applied Optics 36(35), Dec. 1997, pp. 9157-9166.

van der Gracht, Joseph, Edward R. Dowski, Jr., W. Thomas Cathey, and john P. Bowen. "Aspheric Optical Elements for Extended Depth of field Imaging," SPIE, vol. 2537, Aug. 1995, pp. 279-288.

Poon, Ting-Chung, and Masoud Motamedi. "Optical/Digital Incoherent Image Processing for Extended Depth of Field," Applied Optics 26(21), Nov. 1987, pp. 4612-4615.

Siebert, J. (Officer), International Search Report received in PCT/US01/26126, international filing date Aug. 20, 2001, Completion Date Jun. 24, 2003, 3 pages.S.

Veldkamp, Wilfrid B., and McHugh, Thomas J., "Binary Optics", Scientific American, May 1, 1992, vol. 266, No. 5, pp. 50-55.

O'Shea, Donald C. and Harrigan, Michael E., "Chapter 33, Aberration Curves in Lens Design", Handbook of Optics, vol. 1, 1995, pp. 33.1-33.5, McGraw-Hill, New York.

Abstract of JP 60247611 A, published Jul. 12, 1985 (Toshiba KK), Patent Abstracts of Japan, May 6, 1986, vol. 010, No. 119 (p. 435), 1 page.

J. Ojeda-Castaneda, L. R. Berriel-Valdos, and E. Montes, "Spatial filter for increasing the depth of focus", Optics Letters, vol. 10, No. 11, p. 520-522, Nov. 1985.

J. Ojeda-Castaneda, and A. Diaz, "High focal depth by quasibifocus", vol. 27, No. 20, p. 4163-4165, Oct. 15, 1988.

W. Chi and N. George, "Electronic imaging using a logarithmic asphere", Optics Letters, vol. 26, No. 12, p. 875-877, Jun. 15, 2001.

J. Ojeda-Castaneda, E. Tepichin, and A. Pons, "Apodization of annular apertures: Strehl ratio", Applied Optics, vol. 27, No. 24, p. 5140-5145, Dec. 15, 1988.

D. L. Marks, R. A. Stack, D. J. Brady, and J. van der Gracht, "Three-dimensional tomography using a cubic-phase plate extended depth-of-field system", Optics Letters, vol. 24, No. 4, p. 253-255, Feb. 15, 1999.

S. C. Tucker, W. T. Cathey, and E. R. Dowski, Jr, "Extended depth of field and aberration control for inexpensive digital microscope systems", Optics Express, vol. 4, No. 11, p. 467-474, May 24, 1999.

H. Bartelt, J. Ojeda-Castaneda, and E. E. Sicre, "Misfocus tolerance seen by simple inspection of the ambiguity function", Applied Optics, vol. 23, No. 16, p. 2693-2696, Aug. 15, 1984.

J. Ojeda-Castaneda, L. R. Berriel-Valdos, and E. Montes, "Ambiguity function as a design tool for high focal depth", Applied Optics, vol. 27, No. 4, p. 790-795, Feb. 15, 1988.

J. Ojeda-Castaneda, P. Andres, and A. Diaz, "Annular apodizers for low sensitivity to defocus and to spherical aberration", Optics Letters, vol. 11, No. 8, p. 487-489, Aug. 1986.

J. Ojeda-Castaneda, E. Tepichin, and A. Diaz, "Arbitrarily high focal depth with a quasioptimum real and positive transmittance apodizer", Applied Optics, vol. 28, No. 13, p. 2666-2670, Jul. 1, 1989.

J. Ojeda-Castaneda, and L. R. Berriel-Valdos, "Arbitrarily high focal depth with finite apertures", Optics Letters, vol. 13, No. 3, p. 183-185, Mar. 1988.

G. Indebetouw, and H. Bai, "Imaging with Fresnel zone pupil masks: extended depth of field", Applied Optics, vol. 23, No. 23, p. 4299-4302, Dec. 1, 1984.

W. T. Welford, "Use of annular apertures to increase focal depth", Journal of the Optical Society of America, vol. 50, No. 8, p. 749-753, Aug. 1960.

C. Varamit, and G. Indebetouw, "Imaging properties of defocused partitioned pupils", J. Opt. Soc. Am. A, vol. 2, No. 6, p. 799-802, Jun. 1985.

E. R. Dowski Jr., and W. T. Cathey, "Single lens single-image incoherent passive-ranging systems", Applied Optics, vol. 33, No. 29, p. 6762-6773, Oct. 10, 1994.

W. T. Cathey. B. R. Frieden, W. T. Rhodes, and C. K. Rushforth, "Image gathering and processing for enhanced resolution", J. Opt. Soc. Am. A, vol. 1, No. 3, p. 241-250, Mar. 1984.

J. van der Gracht, E. R. Dowski Jr., M. G. Taylor, and D. M. Deaver, "Broadband behavior of an optical-digital focus-invariant system", Optics Letters, vol. 21, No. 13, p. 919-921, Jul. 1, 1996.

G. Hausler, "A method to increase the depth of focus by two step image processing", Optical Communications, vol. 6, No. 1, p. 38-42, Sep. 1972.

C. J Cogswell, N. I. Smith, K. G. Larkin, and P. Hariharan, "Quantitative DIC microscopy using a geometric phase shifter", SPIE, vol. 2984, p. 72-81, 1997.

H. Wang, and F. Gan, "High focal depth with a pure-phase apodizer", Applied Optics, vol. 40, No. 31, p. 5658-5662, Nov. 1, 2001.

H. Wang, and F. Gan, "Phase-shifting apodizers for increasing focal depth", Applied Optics, vol. 41, No. 25, p. 5263-5268, Sep. 1, 2002.

S. S. Sherif, E. R. Dowski, Jr and W. T. Cathey, "A logarithmic phase filter to extend the depth of field of incoerent hybrid imaging systems", Applied Optics, in press.

D. Kermisch, "Partially coherent image processing by laser scanning", Journal of the Optical Society of America, vol. 65, No. 8, p. 887-891, Aug. 1975.

R. J. Pieper and A. Korpel, "Image processing for extended depth of field", Applied Optics, vol. 22, No. 10, p. 1449-1453, May 15, 1983.

G. E. Johnson, E. R. Dowski, Jr, and W. T. Cathey, "Passive ranging through wave-front coding: information and application", Applied Optics, vol. 39, No. 11, p. 1700-1710, Apr. 10, 2000.

G. Y. Sirat, "Conoscopic holography. I. Basic principles and physical basis", J. Opt. Soc. Am. A, vol. 9, No. 1, p. 70-90, Jan. 1992.

E. R. Dowski, Jr, and W. T. Cathey, "Extended depth of field through wave-front coding", Applied Optics, vol. 34, No. 11, p. 1859-1866, Apr. 10, 1995.

H. B. Wach, E. R. Dowski,Jr., and W. T. Cathey, "Control of chromatic focal shift through wave-front coding", Applied Optics, vol. 37, No. 23, p. 5359-5367, Aug. 10, 1998.

D. Kermisch, "Principle of equivalence between scanning and conventional optical imaging systems", J. Opt. Soc. Am, vol. 67, No. 10, p. 1357-1360, Oct. 1977.

J. Ojeda-Castaneda., R. Ramos and A. Noyola-Isgleas, "High-focal depth by apodization and digital restoration", Applied Optics, vol. 27, No. 12, p. 2583-2586, Jun. 15, 1988.

J. Ojeda-Castaneda., and L. R. Berriel-Valdos, "Zone plate for arbitrarily high focal depth", Applied Optics, vol. 29, No. 7, p. 994-997, Mar. 1, 1990.

J.T. McCrickerd, "Coherent processing and depth of focus of annular aperture imagery", Applied Optics, vol. 10, No. 10, p. 2226-2230, Oct. 1971.

M.Mino and Y. Okano, "Improvement in the OTF of a defocused optical system through the use of shade apertures", Applied Optics, vol. 10, No. 10, p. 2219-2225, Oct. 1971.

S. Kubo, M. Inui, and Y. Miyake, "Preferred sharpness of photographic color images", Journal of Imaging Science, vol. 29,No. 6, p. 213-215, Nov./Dec. 1985.

C. J. Cogswell and C. J. R. Sheppard, "Confocal differential interference contrast (DIC) microscopy: including a theoretical analysis of conventional and confocal DIC imaging", Journal of Microscopy, vol. 165, part 1, p. 81-101, Jan. 1992.

J. M. Schmitt, S. L. Lee and K. M. Yung, "An optical coherence microscope with enhanced resolving power in thick tissue", Optics Communications, vol. 142, p. 203-207, Oct. 15, 1997.

K. J. Barnard, E. A. Watson and P. F. McManamon, "Nonmechanical microscanning using optical space-fed phased arrays", Optical Engineering, vol. 33, No. 9, p. 3063-3071, Sep. 1994.

W. T. Cathey and W. C. Davis, "Imaging system with range to each pixel", J Opt. Soc. Am A, vol. 3, No. 9, p. 1537-1542, Sep. 1986.

J. E. Greivenkamp, "Color dependent optical prefilter for the suppression of aliasing artifacts", Applied Optics, vol. 29, No. 5, p. 676-684, Feb. 10, 1990.

J. T. McCrickerd, "Coherent processing and depth of focus of annular aperture imagery", Applied Optics, vol. 10, No. 10, p. 2226-2230, Oct. 1971.

M. Kawakita, K. Iizuka, T. Aida, H. Kikuchi, H. Fujikake, J. Yonai and K. Takizawa, "Axi-version camera: a three-dimension camera", In Three-dimensional Image Capture and Applications III, Brian D. Corner, Joseph H. Nurre, Editors, Proceedings of SPIE, vol. 3958, p. 61-70, 2000.

C. Wust and D. W. Capson, "Surface profile measurement using color fringe projection", Machine Vision and Applications, vol. 4, p. 193-203, 1991.

S. V. Shatalin, J. B. Tan, R. Juskaitis and T. Wilson, "Polarization contrast imaging of thin films in scanning microscopy", Optics Communications, vol. 116, p. 291-299, May 1, 1995.

T. Fukano, "Geometrical cross-sectional imaging by a heterodyne wavelength-scanning interference confocal microscope", Optics Letters, vol. 25, No. 8, p. 548-550, Apr. 15, 2000.

Q-S. Chen and M. S. Weinhous, "Sub-pixel shift with fourier transformation to achieve efficient and high quality image interpolation", SPIE, vol. 2, No. 3661, p. 728-736, Feb. 1999.

H. Wei, and T. D. Binnie, "High-resolution image reconstruction for multiple low-resolution images", 7th International Conference on Image Processing and Its Applications, Pub. # 465, vol. 2 p. 596-600 (1999).

G. Hausler, and E. Korner, "Imaging with expanded depth of focus", Zeiss Inform, Oberkochen, 29, No. 98E, p. 9-13 (1986/1987).

* cited by examiner

150

160

EXTENDED DEPTH OF FIELD OPTICAL SYSTEMS

CROSS-REFERENCE TO RELATED APPLICATIONS

This application is a continuation in part of patent application Ser. No. 08/823,894 filed on Mar. 17, 1997 now U.S. Pat. No. 5,748,371 for Extended Depth of Field Optical Systems U.S. Pat. No. 5,521,695, issued May 28, 1996 and entitled "Range Estimation Apparatus and Method," is incorporated herein by reference.

This invention was made with Government support awarded by the National Science Foundation and the Office of Naval Research. The Government has certain rights in this invention.

BACKGROUND OF THE INVENTION

1. Field of the Invention

This invention relates to apparatus and methods for increasing the depth of field and decreasing the wavelength sensitivity of incoherent optical systems. This invention is particularly useful for increasing the useful range of passive ranging systems. The same techniques are applicable to passive acoustical and electromagnetic ranging systems.

2. Description of the Prior Art

Improving the depth of field of optical systems has long been a goal of those working with imaging systems. A need remains in the art for a simple imaging system, with one or only a few lenses, which none the less provides greatly expanded depth of field focusing. Depth of field refers to the depth in the scene being imaged. Depth of focus refers to the depth in the image recording system.

A drawback of simple optical systems is that the images formed with red light focus in a different plane from the images formed with blue or green light. There is only a narrow band of wavelengths in focus at one plane; the other wavelengths are out of focus. This is called chromatic aberration. Currently, extending the band of wavelengths that form an in-focus image is accomplished by using two or more lenses with different indices of refraction to form what is called an achromatic lens. If it were possible to extend the depth of field of the system, the regions would extended where each wavelength forms an in-focus image. If these regions can be made to overlap the system, after digital processing, can produce (for example) a high resolution image at the three different color bands of a television camera. The extended depth of focus system can, of course, be combined with an achromatic lens to provide even better performance.

There are several other aberrations that result in misfocus. Astigmatism, for example, occurs when vertical and horizontal lines focus at different planes. Spherical aberration occurs when radial zones of the lens focus at different planes. Field curvature occurs when off-axis field points focus on a curved surface. And temperature dependent focus occurs when changes in ambient temperature affect the lens, shifting the best focus position. Each of these aberrations is traditionally compensated for by the use of additional lens elements.

The effects of these aberrations that cause misfocus are reduced by extending the depth of field of the imaging system. A larger depth of field gives the lens designer greater flexibility in balancing the aberrations.

The use of optical masks to improve image quality is also a popular field of exploration. For example, "Improvement in the OTF of a Defocussed Optical System Through the Use of Shaded Apertures", by M. Mino and Y. Okano, *Applied Optics*, Vol. 10 No. 10, October 1971, discusses decreasing the amplitude transmittance gradually from the center of a pupil towards its rim to produce a slightly better image. "High Focal Depth By Apodization and Digital Restoration" by J. Ojeda-Castaneda et al, *Applied Optics*, Vol. 27 No. 12, June 1988, discusses the use of an iterative digital restoration algorithm to improve the optical transfer function of a previously apodized optical system. "Zone Plate for Arbitrarily High Focal Depth" by J. Ojeda-Castaneda et al, *Applied Optics*, Vol. 29 No. 7, March 1990, discusses use of a zone plate as an apodizer to increase focal depth.

All of these inventors, as well as all of the others in the field, are attempting to do the impossible: achieve the point spread function of a standard, in-focus optical system along with a large depth of field by purely optical means. When digital processing has been employed, it has been used to try to slightly clean up and sharpen an image after the fact.

SUMMARY OF THE INVENTION

The systems described herein give in-focus resolution over the entire region of the extended depth of focus. Thus they are especially useful for compensating for misfocus aberrations such as spherical aberrations, astigmatism, field curvature, chromatic aberration, and temperature-dependent focus shifts.

An object of the present invention is to increase depth of field in an incoherent optical imaging system by adding a special purpose optical mask to the system that has been designed to make it possible for digital processing to produce an image with in-focus resolution over a large range of misfocus by digitally processing the resulting intermediate image. The mask causes the optical transfer function to remain essentially constant within some range away from the in-focus position. The digital processing undoes the optical transfer function modifying effects of the mask, resulting in the high resolution of an in-focus image over an increased depth of field.

A general incoherent optical system includes a lens for focussing light from an object into an intermediate image, and means for storing the image, such as film, a video camera, or a Charge Coupled Device (CCD) or the like. The depth of field of such an optical system is increased by inserting an optical mask between the object and the CCD. The mask modifies the optical transfer function of the system such that the optical transfer function is substantially insensitive to the distance between the object and the lens, over some range of distances. Depth of field post-processing is done on the stored image to restore the image by reversing the optical transfer alteration accomplished by the mask. For example, the post-processing means implements a filter which is the inverse of the alteration of the optical transfer function accomplished by the mask.

In general, the mask is located either at or near the aperture stop of the optical system or an image of the aperture stop. Generally, the mask is placed in a location of the optical system such that the resulting system can be approximated by a linear system. Placing the mask at the aperture stop or an image of the aperture stop may have this result. Preferably, the mask is a phase mask that alters the phase while maintaining the amplitude of the light. For example, the mask could be a cubic phase modulation mask.

The mask may be utilized in a wide field of view single lens optical system, or in combination with a self focussing fiber or lens, rather than a standard lens.

A mask for extending the depth of field of an optical system may be constructed by examining the ambiguity functions related to several candidate mask functions to determine which particular mask function has an optical transfer function which is closest to constant over a range of object distances and manufacturing a mask having the mask function of that particular candidate. The function of the mask may be divided among two masks situated at different locations in the system.

A second object of the invention is to increase the useful range of passive ranging systems. To accomplish this object, the mask modifies the optical transfer function to be object distance insensitive as above, and also encodes distance information into the image by modifying the optical system such that the optical transfer function contains zeroes as a function of object range. Ranging post-processing means connected to the depth of field post-processing means decodes the distance information encoded into the image and from the distance information computes the range to various points within the object. For example, the mask could be a combined cubic phase modulation and linear phase modulation mask.

A third object of this invention is to extend the band of wavelengths (colors) that form an in-focus image. By extending the depth of field of the system, the regions are extended where each wavelength forms an in-focus image. These regions can be made to overlap and the system, after digital processing, can produce a high resolution image at the three different color bands.

A fourth object of this invention is to extend the depth of field of imaging systems which include elements whose optical properties vary with temperature, or elements which are particularly prone to chromatic aberration.

A fifth object of this invention is to extend the depth of field of imaging systems to minimize the effects of misfocus aberrations like spherical aberration, astigmatism, and field curvature. By extending the depth of field the misfocus aberrations can have overlapping regions of best focus. After digital processing, can produce images that minimize the effects of the misfocus aberrations.

A sixth object of this invention is to physically join the mask for extending depth of field with other optical elements, in order to increase the depth of field of the imaging system without adding another optical element.

Those having normal skill in the art will recognize the foregoing and other objects, features, advantages and applications of the present invention from the following more detailed description of the preferred embodiments as illustrated in the accompanying drawings.

DESCRIPTION OF THE PREFERRED EMBODIMENTS

Figure 1:
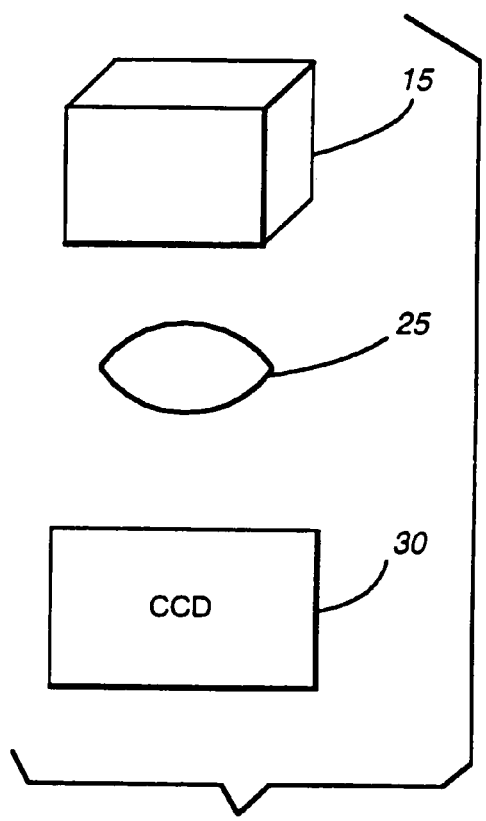
FIG. 1 shows a standard prior art imaging system.

FIG. 1 (prior art) shows a standard optical imaging system. Object 15 is imaged through lens 25 onto Charge Coupled Device (CCD) 30. Such a system creates a sharp, in-focus image at CCD 30 only if object 15 is located at or very close to the in-focus object plane. If the distance from the back principal plane of lens 25 to CCD 30 is $d_i$, and focal length of lens 25 is f, the distance, $d_o$, from the front principal plane of lens 25 to object 15 must be chosen such that:

$$\frac{1}{d_o} + \frac{1}{d_i} - \frac{1}{f} = 0$$

in order for the image at CCD 30 to be in-focus. The depth of field of an optical system is the distance the object can move away from the in-focus distance and still have the image be in focus. For a simple system like FIG. 1, the depth of field is very small.

Figure 2:
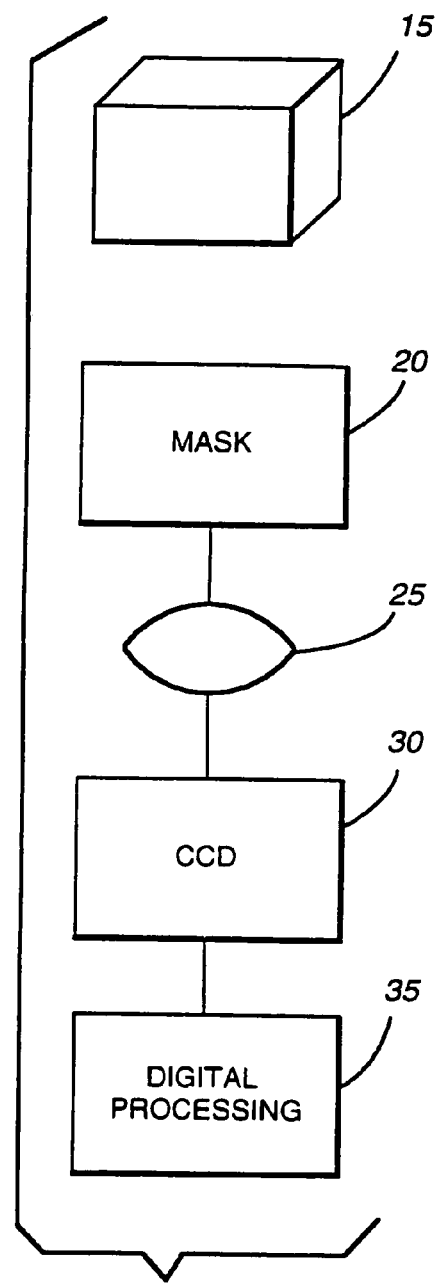
FIG. 2 shows an Extended Depth of Field (EDF) imaging system in accordance with the present invention.

FIG. 2 shows the interaction and operation of a multi-component extended depth of field system in accordance with the invention. Object 15 is imaged through optical mask 20 and lens 25 onto Charge Coupled Device (CCD) system 30, and image post-processing is performed by digital processing system 35. Those skilled in the art will appreciate that any image recording and retrieval device could be used in place of CCD system 30.

Mask 20 is composed of an optical material, such as glass or plastic film, having variations in opaqueness, thickness, or index of refraction. Mask 20 preferably is a phase mask, affecting only the phase of the light transmitted and not its amplitude. This results in a high efficiency optical system. However, mask 20 may also be an amplitude mask or a combination of the two. Mask 20 is designed to alter an incoherent optical system in such a way that the system response to a point object, or the Point Spread Function (PSF), is relatively insensitive to the distance of the point from the lens 25, over a predetermined range of object distances. Thus, the Optical Transfer Function (OTF) is also relatively insensitive to object distance over this range. The resulting PSF is not itself a point. But, so long as the OTF does not contain any zeroes, image post processing may be used to correct the PSF and OTF such that the resulting PSF is nearly identical to the in-focus response of a standard optical system over the entire predetermined range of object distances.

The object of mask 20 is to modify the optical system in such a way that the OTF of the FIG. 2 system is unaffected by the misfocus distance over a particular range of object distances. In addition, the OTF should not contain zeroes, so that the effects of the mask (other than the increased depth of field) can be removed in post-processing.

A useful method of describing the optical mask function P(x) (P(x) is described in conjunction with FIGS. 3–30 below) is the ambiguity function method. It happens that the OTF equation for an optical system can be put in a form similar to the well known ambiguity function A(u,v). The ambiguity function is used in radar applications and has been extensively studied. The use and interpretation of the ambiguity function for radar systems are completely different from the OTF, but the similarity in the form of the equations helps in working with the OTF. The ambiguity function is given by:

$$A(u,v) = \int \hat{P}(x+u/2)\hat{P}^*(x-u/2)e^{j2\pi xv}dx$$

where * denotes complex conjugate and where the mask function $\hat{P}(x)$ is in normalized coordinates:

$$P(x) = P\left(x\frac{D}{2\pi}\right), P(x) = 0 |x| > \pi$$

with D being the length of the one-dimensional mask. The above assumes two dimensional rectangularly separable masks for simplicity. Such systems theoretically can be completely described by a one dimensional mask. Simple extensions of the ambiguity function above can be used to evaluate general two-dimensional masks.

As is known to those skilled in the art, given a general optical mask function P(x), one can calculate the response of the incoherent OTF to any value of misfocus ψ by the equation:

$$H(u,\psi) = \int (\hat{P}(x+u/2)e^{j(x+u/2)^2\psi})(\hat{P}^*(x-u/2)e^{-j(x-u/2)^2\psi})dx$$

The independent spatial parameter x and spatial frequency parameter u are unitless because the equation has been normalized.

ψ is a normalized misfocus parameter dependent on the size of lens 25 and the focus state:

$$\psi = \frac{L^2}{4\pi\lambda}\left(\frac{1}{f} - \frac{1}{d_0} - \frac{1}{d_i}\right)$$

Where L is the length of the lens, $\lambda$ is the wavelength of the light, f is the focal length of lens 25, $d_o$ is the distance from the front principal plane to the object 15, and $d_i$ is the distance from the rear principal plane to the image plane, located at CCD 30. Given fixed optical system parameters, misfocus $\psi$ is monotonically related to object distance $d_o$.

It can be shown that the OTF and the ambiguity function are related as:

$$H(u,\psi) = A(u, u\psi/\pi)$$

Therefore, the OTF is given by a radial slice through the ambiguity function A(u,v) that pertains to the optical mask function $\hat{P}(x)$. This radial line has a slope of $\psi/\pi$. The process of finding the OTF from the ambiguity function is shown in FIGS. 4–8. The power and utility of the relationship between the OTF and the ambiguity function lie in the fact that a single two dimensional function, A(u,v), which depends uniquely on the optical mask function $\hat{P}(x)$, can represent the OTF for all values of misfocus. Without this tool, it would be necessary to calculate a different OTF function for each value of misfocus, making it difficult to determine whether the OTF is essentially constant over a range of object distances.

A general form of one family of phase masks is Cubic Phase Modulation (Cubic-PM). The general form is:

$$P(x, y) = \exp(j(\alpha x^3 + \beta y^3 + \gamma x^2 y + \delta xy^2)), |x| \leq \pi, |y| \leq \pi$$

Choice of the constants, $\alpha$, $\beta$, $\gamma$, and $\delta$ allow phase functions that are rectangulary separable (with $\gamma=\delta=0$) to systems whose modulation transfer functions (MTF's) are circularly symmetric ($\alpha=\beta=\alpha_0$, $\gamma=\delta=-3\alpha_0$). For simplicity we will use the symmetric rectangularly seperable form, which is given by:

$$P(x,y) = \exp(j\alpha(x^3+y^3)), |x| \leq \pi, |y| \leq \pi$$

Since this form is rectangularly separable, for most analysis only its one dimensional component must be considered:

$$\hat{P}(x) = \exp(j\alpha x^3), |x| \leq \pi$$

where $\alpha$ is a parameter used to adjust the depth of field increase.

Figure 3:
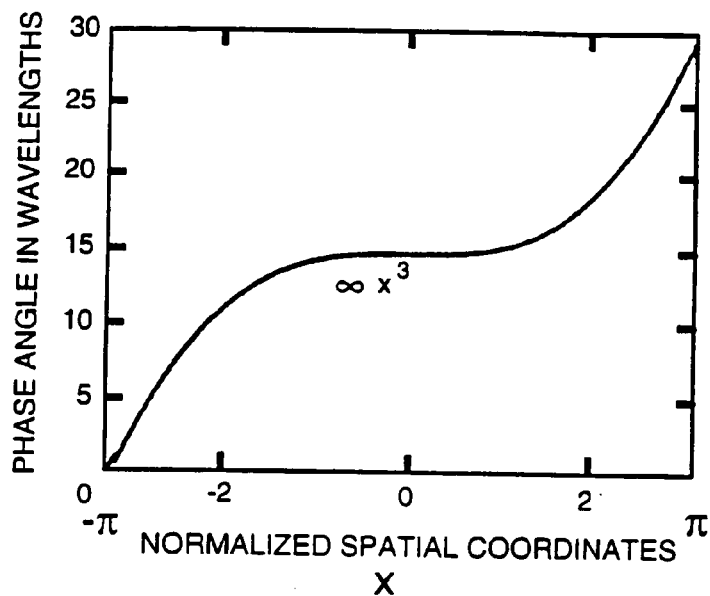
FIG. 3 shows a mask profile for a Cubic-PM (C-PM) mask used in FIG. 2.

FIG. 3 shows the mask implementing this rectangularly separable cubic phase function. When $\alpha=0$, the mask function is the standard rectangular function given by no mask or by a transparent mask. As the absolute value of $\alpha$ increases, the depth of field increases. The image contrast before post-processing also decreases as $\alpha$ increases. This is because as $\alpha$ increases, the ambiguity function broadens, so that it is less sensitive to misfocus. But, since the total volume of the ambiguity function stays constant, the ambiguity function flattens out as it widens.

For large enough $\alpha$, the OTF of a system using a cubic PM mask can be approximated by:

$$H(u,\psi) \approx \sqrt{\frac{\pi}{3|\alpha u|}} e^{-j\frac{\alpha u^3}{4}}, u \neq 0$$

$$H(u,\psi) \approx 2, u=0$$

Appendix A of the parent patent gives the mathematics necessary to arrive at the above OTF function.

Thus, the cubic-PM mask is an example of a mask which modifies the optical system to have a near-constant OTF over a range of object distances. The particular range for which the OTF does not vary much is dependent of $\alpha$. The range (and thus the depth of field) increases with $\alpha$. However, the amount that depth of field can be increased is practically limited by the fact that contrast decreases as $\alpha$ increases, and eventually contrast will go below the system noise.

FIGS. 4 through 30 compare and contrast the performance of the standard imaging system of FIG. 1 and a preferred embodiment of the extended depth of field system of FIG. 2, which utilizes the C-PM mask of FIG. 3.

In the following description, the systems of FIG. 1 and FIG. 2 are examined using three methods. First, the magnitude of the OTFs of the two systems are examined for various values of misfocus. The magnitude of the OTF of a system does not completely describe the quality of the final image. Comparison of the ideal OTF (the standard system of FIG. 1 when in focus) with the OTF under other circumstances gives a qualitative feel for how good the system is.

Second, the PSFs of the two systems are compared. The full width at half maximum amplitude of the PSFs gives a quantitative value for comparing the two systems. Third, images of a spoke picture formed by the two systems are compared. The spoke picture is easily recognizable and contains a large range of spatial frequencies. This comparison is quite accurate, although it is qualitative.

Figure 4:
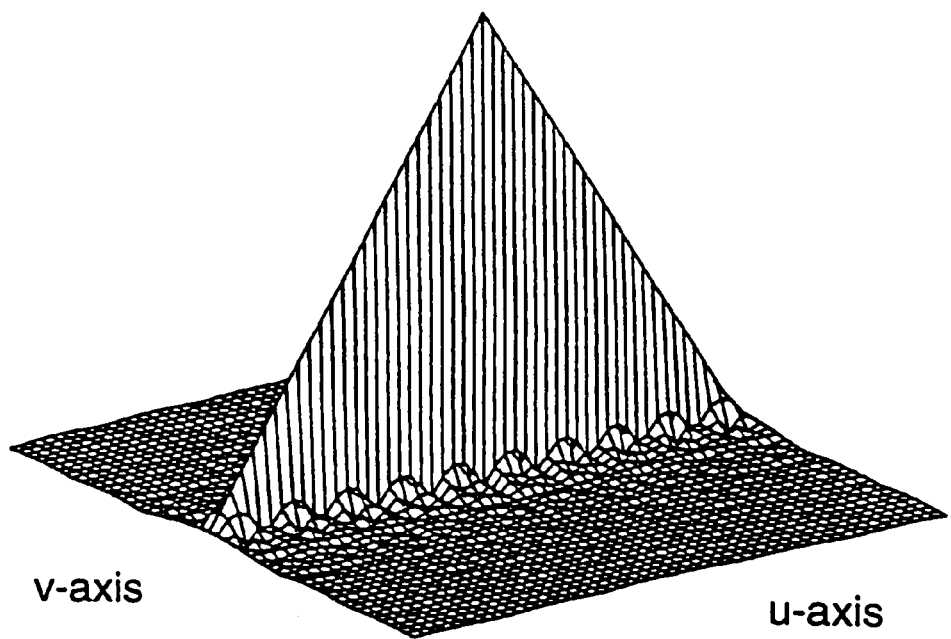
FIG. 4 shows the ambiguity function of the standard system of FIG. 1.
Figure 5:
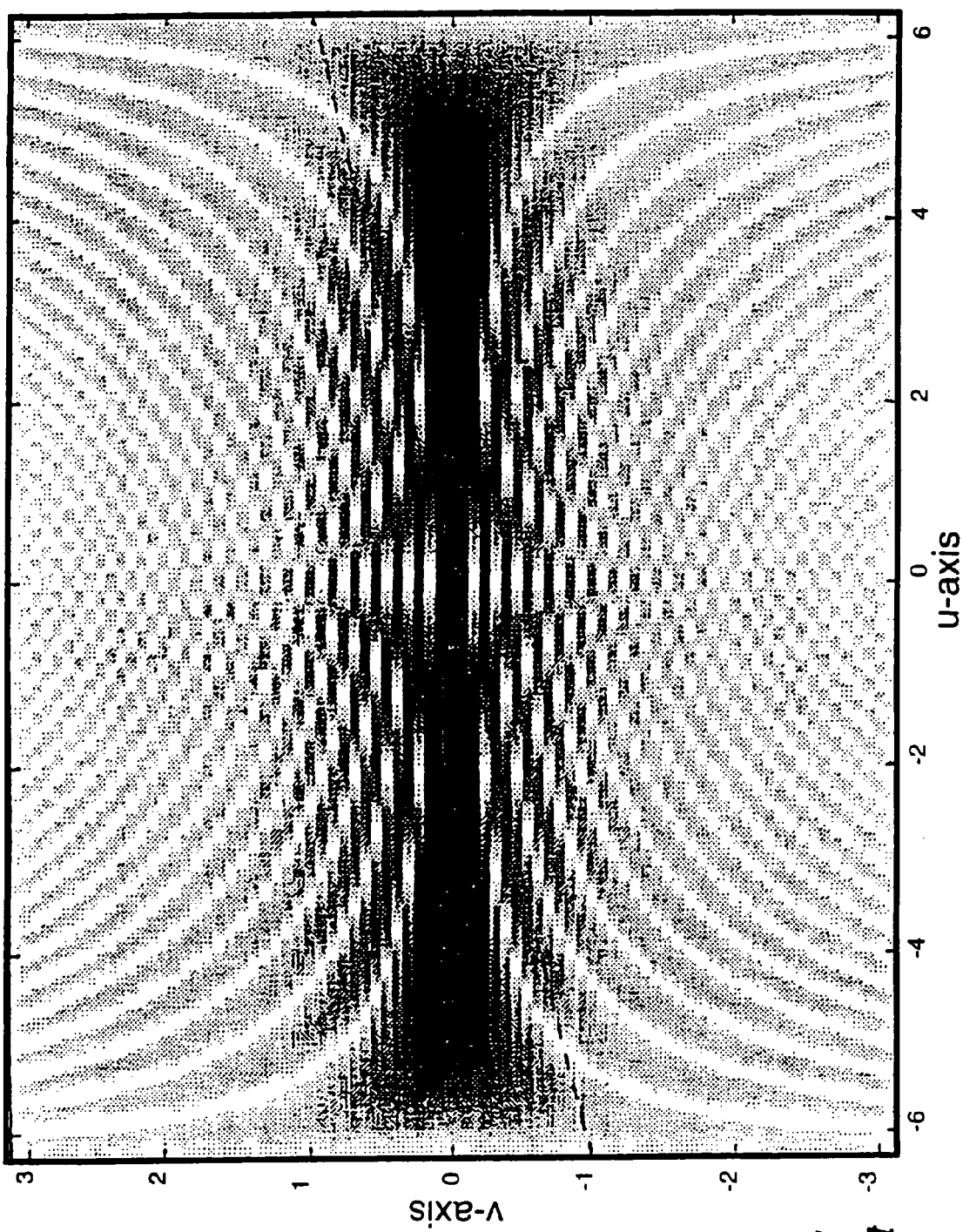
FIG. 5 shows a top view of the ambiguity function of FIG. 4.

FIG. 4 shows the ambiguity function of the standard optical system of FIG. 1. Most of the power is concentrated along the v=0 axis, making the system very sensitive to misfocus. FIG. 5 is the top view of FIG. 4. Large values of the ambiguity function are represented by dark shades in this figure. The horizontal axis extends from $-2\pi$ to $2\pi$. As discussed above, the projection of a radial line drawn through the ambiguity function with slope $\psi/\pi$ determines the OTF for misfocus $\psi$. This radial line is projected onto the spatial frequency u axis. For example, the dotted line on FIG. 5 was drawn with a slope of $1/(2\pi)$. This line corresponds to the OTF of the standard system of FIG. 1 for a misfocus value of $\psi=\frac{1}{2}$. The magnitude of this OTF is shown in FIG. 7.

Figure 6:
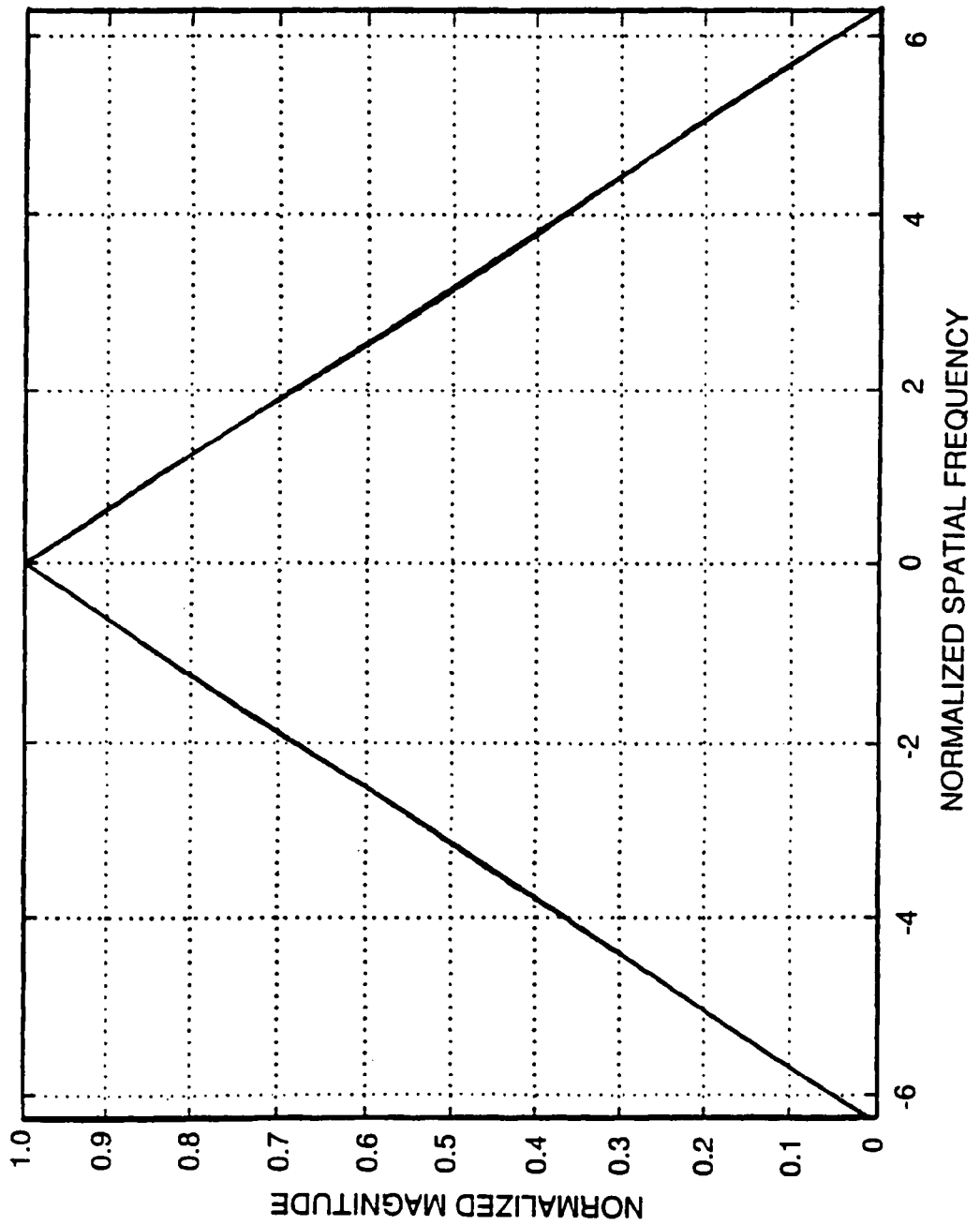
FIG. 6 shows the OTF for the standard FIG. 1 system with no misfocus.

FIG. 6 shows the magnitude of the OTF of the standard system of FIG. 1 with no misfocus. This plot corresponds to the radial line drawn horizontally along the horizontal u axis in FIG. 5.

Figure 7:
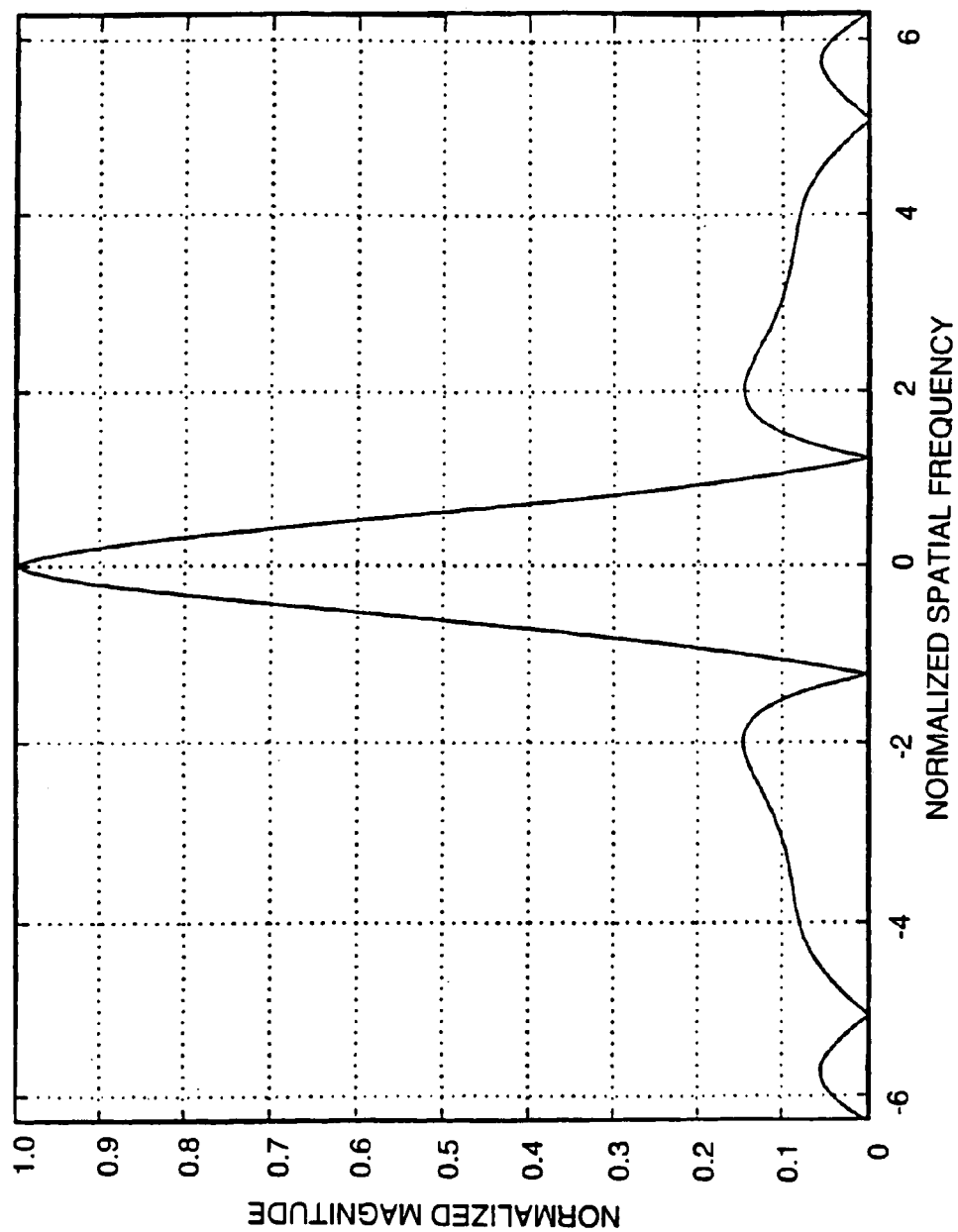
FIG. 7 shows the OTF for the standard FIG. 1 system with mild misfocus.

FIG. 7 shows the magnitude of the OTF for a relatively mild misfocus value of $\frac{1}{2}$. This OTF corresponds to the dotted line in FIG. 5. Even for a misfocus of $\frac{1}{2}$, this OTF is dramatically different from the OTF of the in-focus system, shown in FIG. 6.

Figure 8:
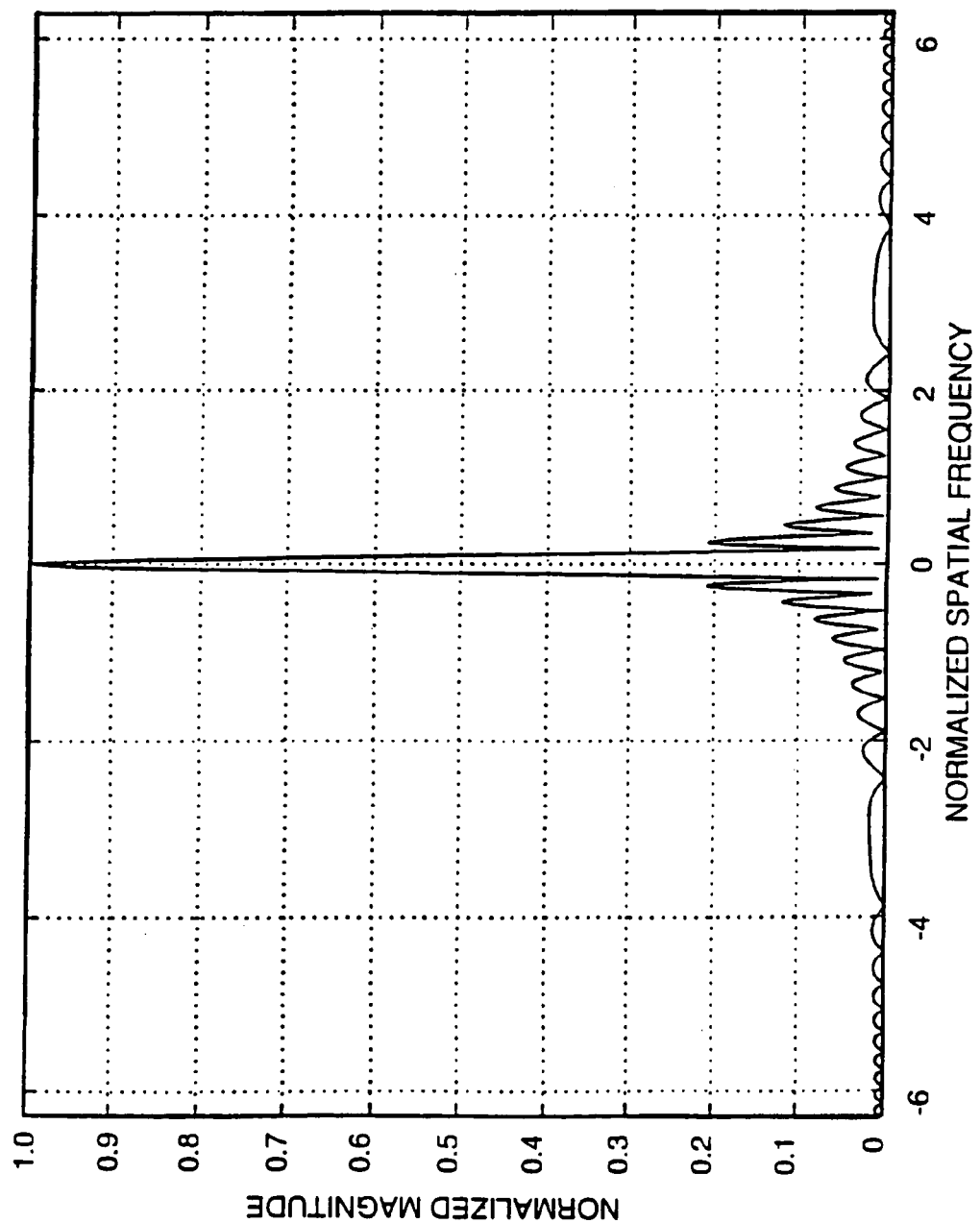
FIG. 8 shows the Optical Transfer Function (OTF) for the standard FIG. 1 system with large misfocus.

FIG. 8 shows the magnitude of the OTF for a rather large misfocus value of $\Psi=3$. It bears very little resemblance to the in-focus OTF of FIG. 6.

Figure 9:
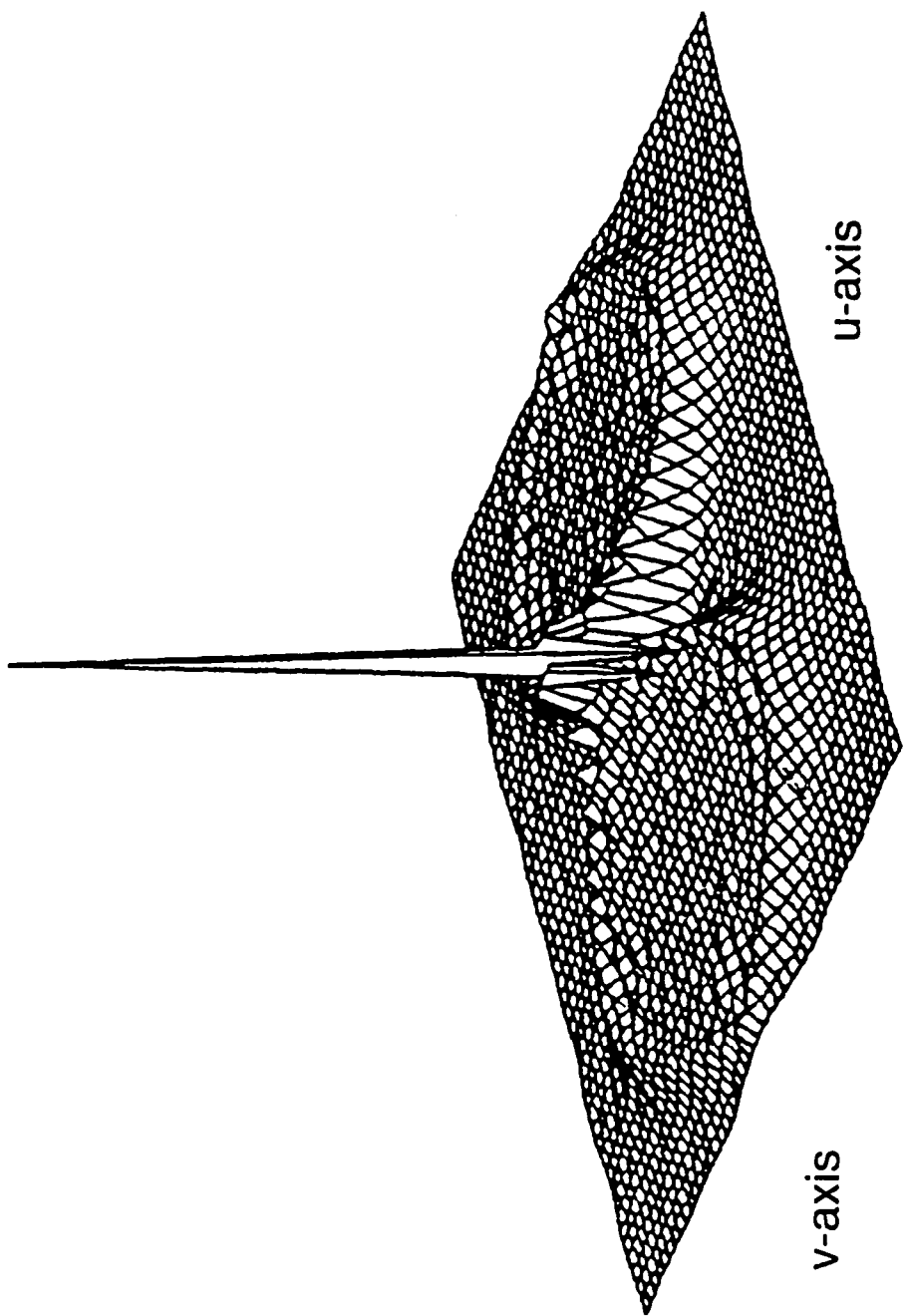
FIG. 9 shows the ambiguity function of the C-PM mask of FIG. 3.

FIG. 9 shows the ambiguity function of the extended depth of field system of FIG. 2 utilizing the C-PM mask of FIG. 3 (the C-PM system). This ambiguity function is relatively flat, so that changes in misfocus produce little change in the system OTF. α, as previously defined, is set equal to three for this particular system, designated "the C-PM system" herein.

Figure 10:
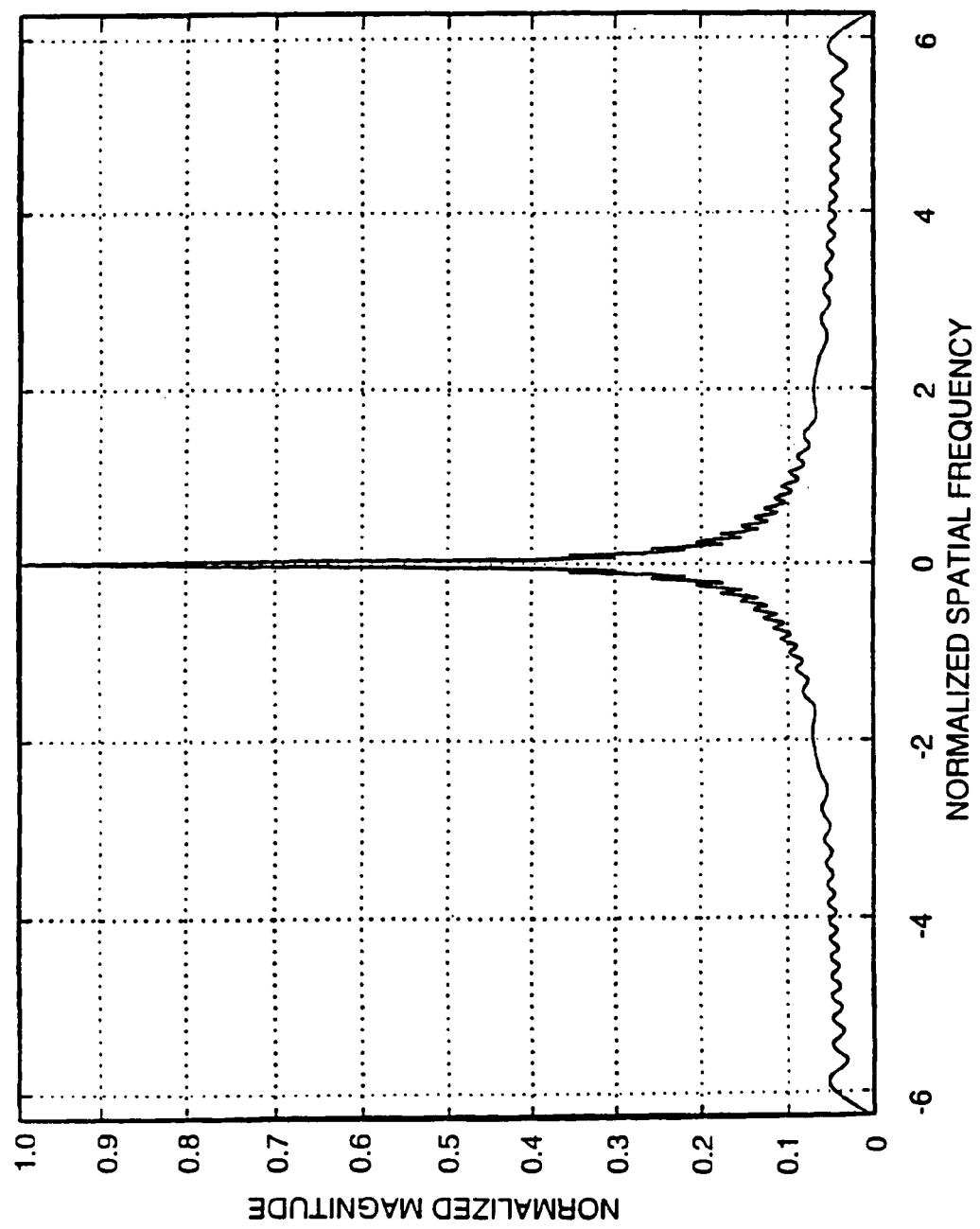
FIG. 10 shows the OTF of the extended depth of field system of FIG. 2, with the C-PM mask of FIG. 3, with no misfocus and before digital processing.
Figure 11:
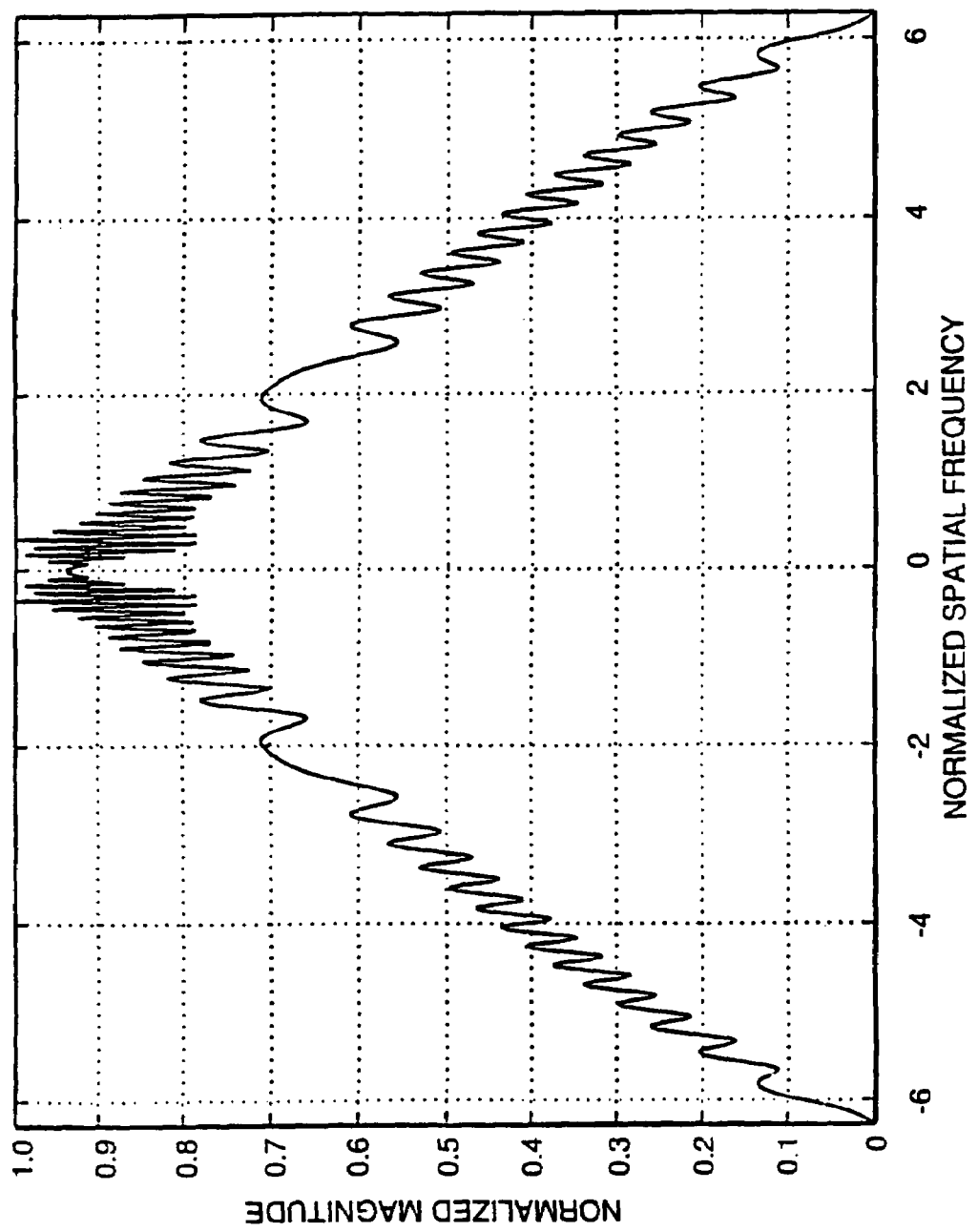
FIG. 11 shows the OTF of the C-PM system of FIG. 2 with no misfocus, after processing.

FIG. 10 shows the magnitude of the OTF of the C-PM system of FIG. 2 before digital filtering is done. This OTF does not look much like the ideal OTF of FIG. 6. However, the OTF of the entire C-PM EDF system (which includes filtering) shown in FIG. 11 is quite similar to FIG. 6. The high frequency ripples do not affect output image quality much, and can be reduced in size by increasing α.

Figure 12:
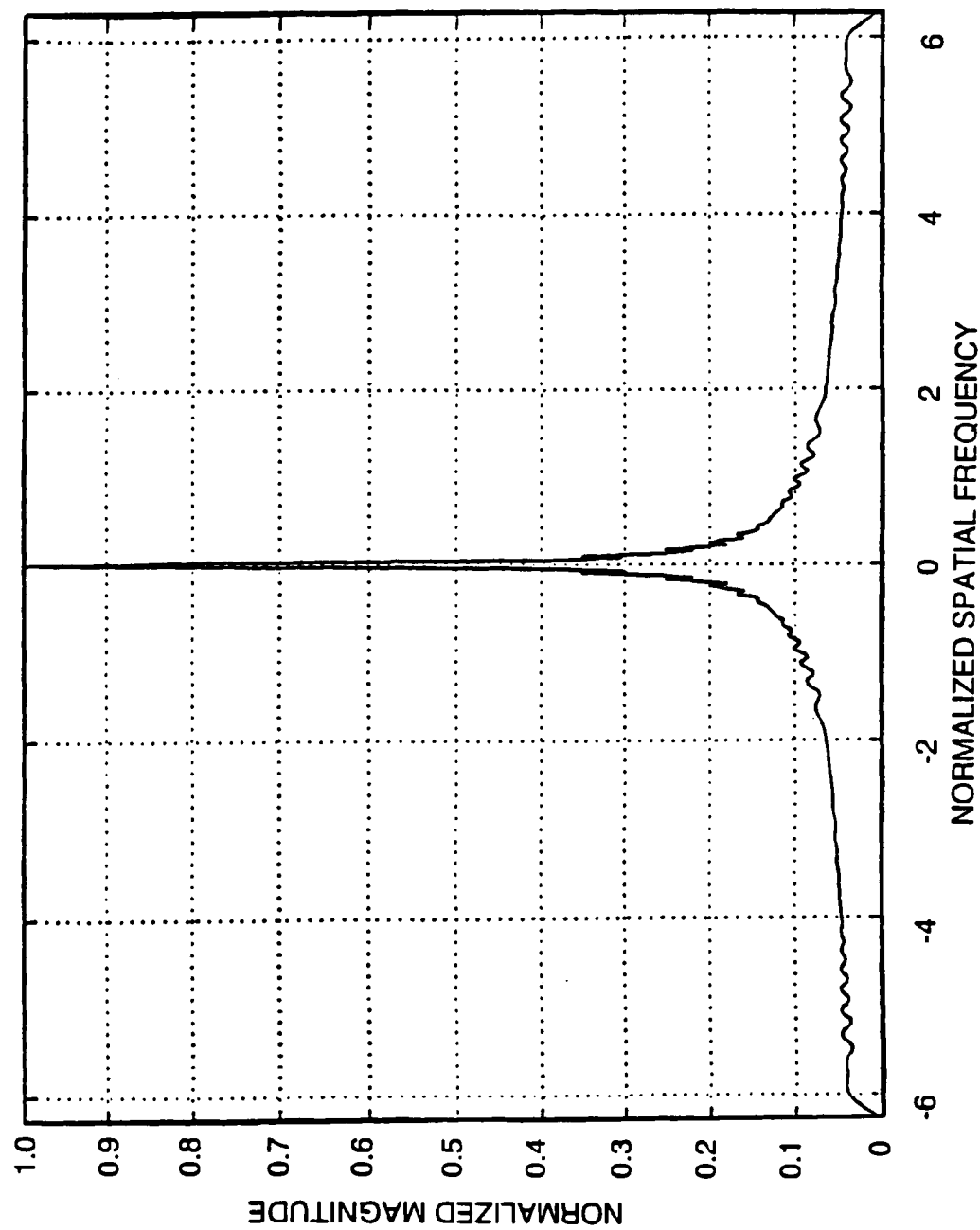
FIG. 12 shows the OTF of the C-PM system of FIG. 2 with mild misfocus (before processing).
Figure 13:
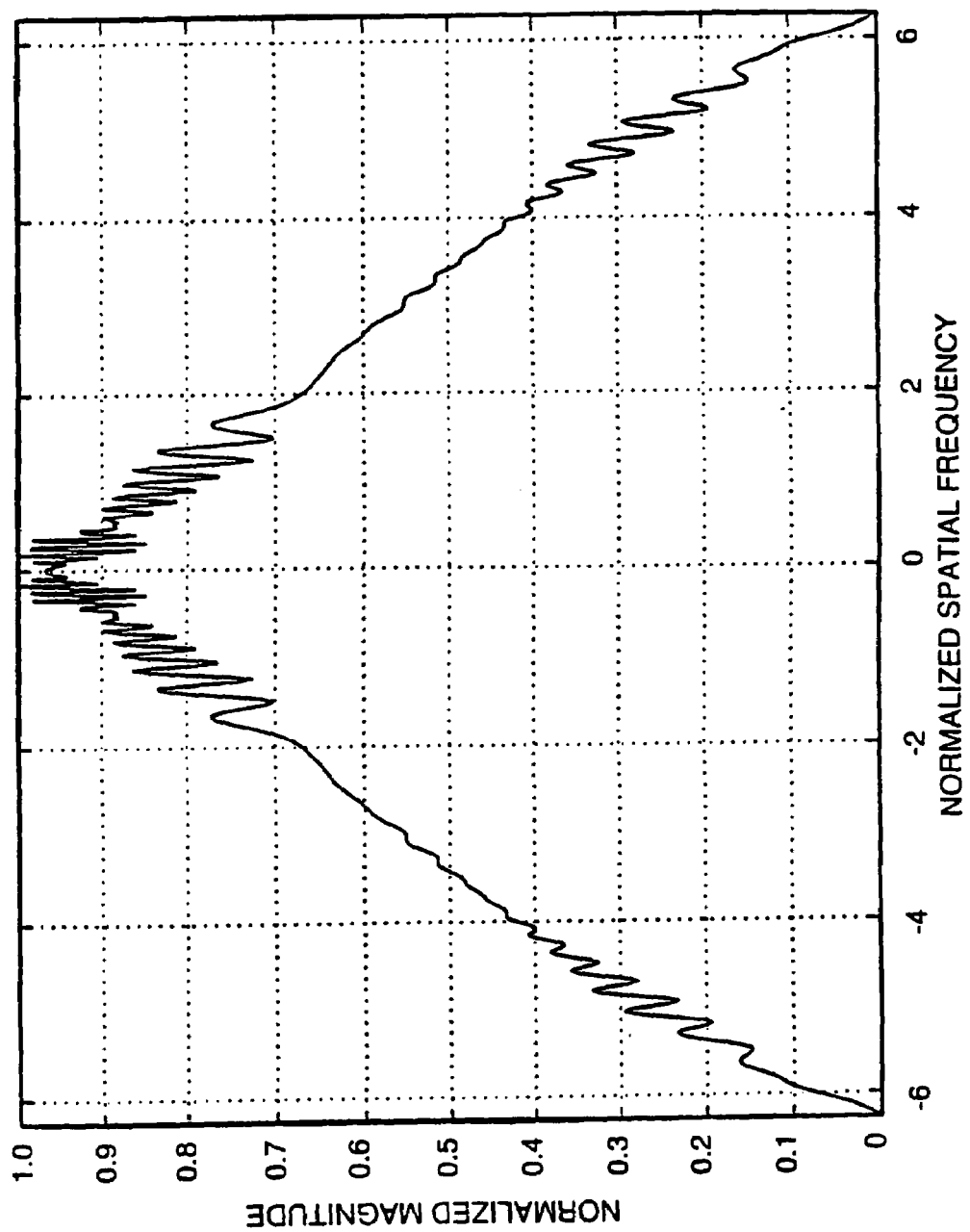
FIG. 13 shows the OTF of the C-PM system of FIG. 2 with mild misfocus (after processing).

FIG. 12 shows the magnitude of the OTF of the C-PM system of FIG. 2 with mild misfocus ($\psi=\frac{1}{2}$), before filtering. Again, this OTF doesn't look like FIG. 6. It does, however look like FIG. 10, the OTF for no misfocus. Thus, the same filter produces the final OTF shown in FIG. 13, which does resemble FIG. 6.

Figure 14:
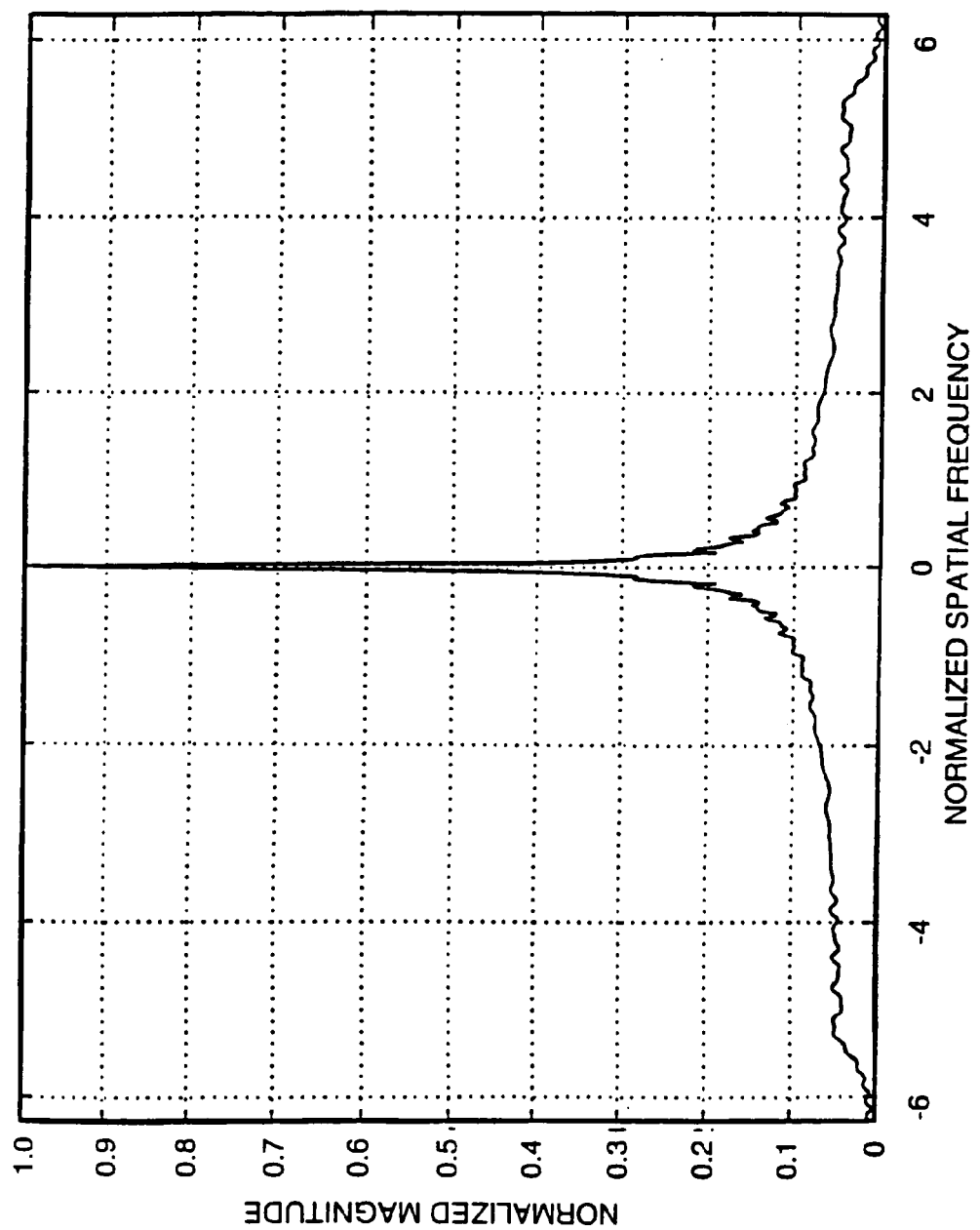
FIG. 14 shows the OTF of the C-PM system of FIG. 2 with large misfocus (before processing).
Figure 15:
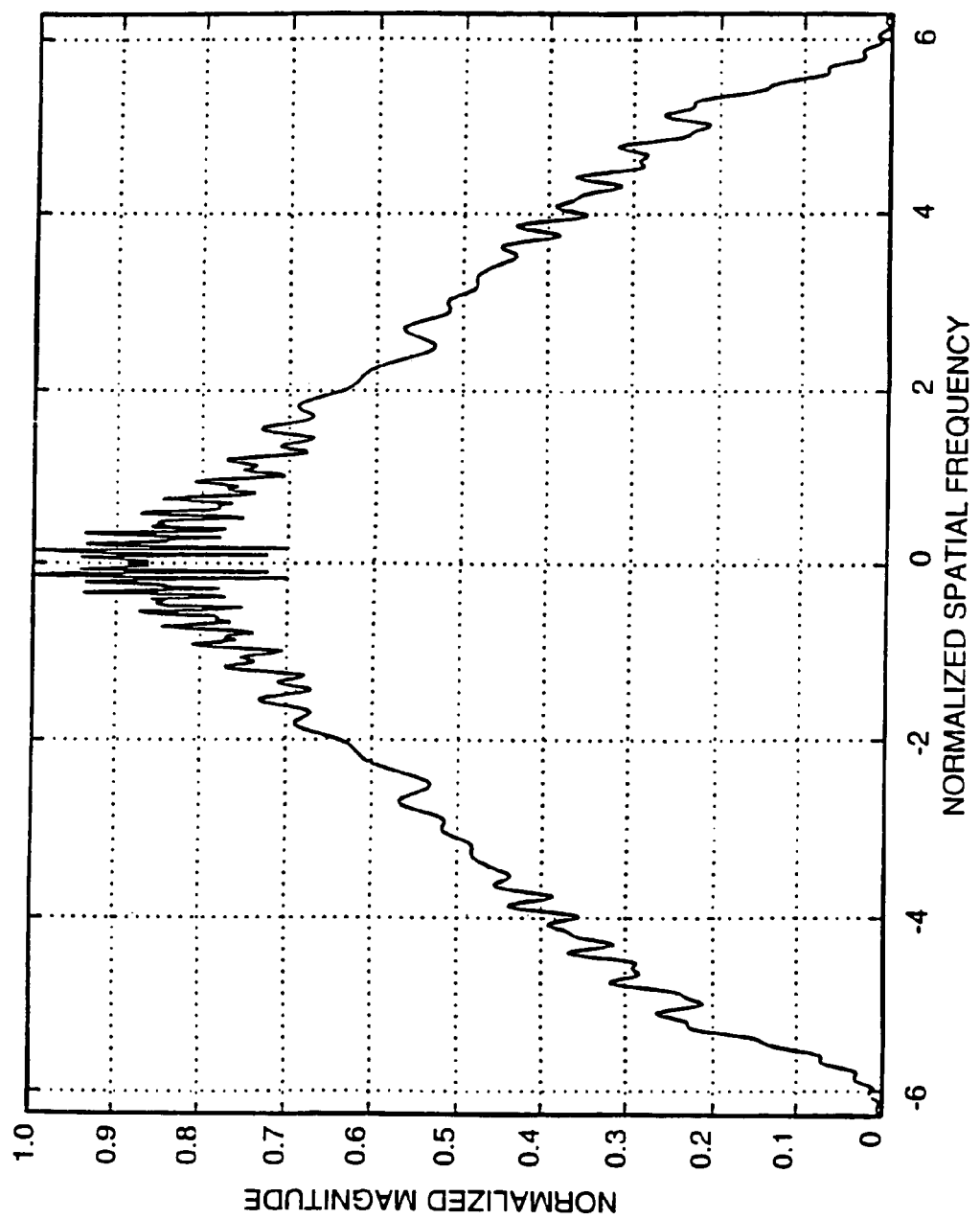
FIG. 15 shows the OTF of the C-PM system of FIG. 2 with large misfocus (after processing).

FIG. 14 shows the magnitude of the OTF of the C-PM system of FIG. 2 with large misfocus ($\psi=3$), before filtering. FIG. 15 shows the magnitude of the OTF of the entire C-PM system. Notice that it is the fact that the OTFs before processing in all three cases (no misfocus, mild misfocus, and large misfocus) are almost the same that allows the same post-processing, or filter, to restore the OTF to near ideal.

Note that while the OTF of the FIG. 2 C-PM system is nearly constant for the three values of misfocus, it does not resemble the ideal OTF of FIG. 10. Thus, it is desirable that the effect of the FIG. 3 mask (other than the increased depth of field) be removed by post-processing before a sharp image is obtained. The effect of the mask may be removed in a variety of ways. In the preferred embodiment, the function implemented by post-processor 35 (preferably a digital signal processing algorithm in a special purpose electronic chip, but also possible with a digital computer or an electronic or optical analog processor) is the inverse of the OTF (approximated as the function H(u), which is constant over $\psi$). Thus, the post-processor 35 must, in general, implement the function:

$$\sqrt{\frac{3|\alpha u|}{\pi}} e^{j\frac{\alpha u^3}{4}}$$

Figure 16:
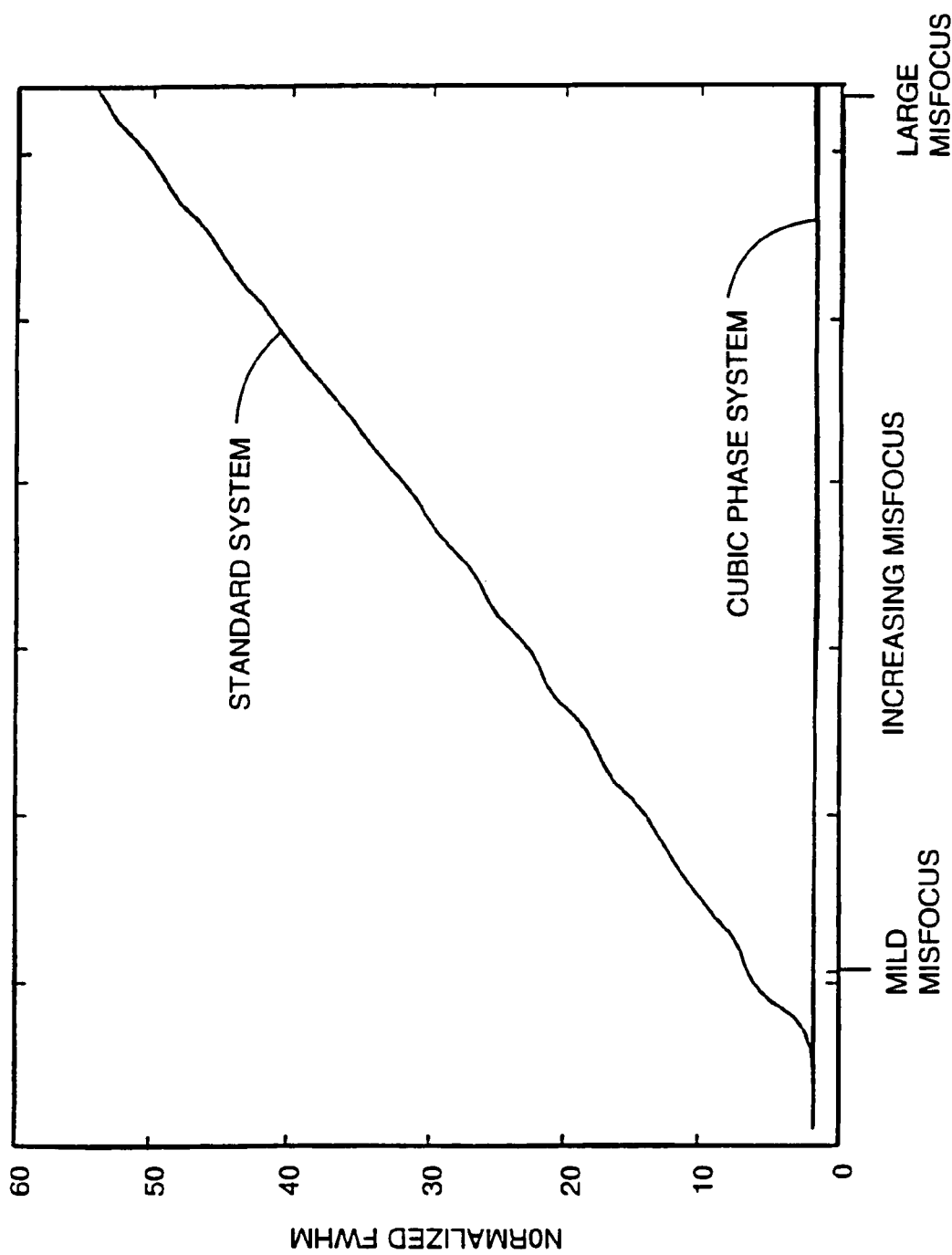
FIG. 16 shows a plot of the Full Width at Half Maximum (FWHM) of the point spread function (PSF) as misfocus increases, for the standard system of FIG. 1 and the C-PM EDF system of FIG. 2.

FIGS. 16–23 show the Point Spread Functions (PSFs) for the standard system of FIG. 1 and the C-PM system of FIG. 2 for varying amounts of misfocus. FIG. 16 shows a plot of normalized Full Width at Half Maximum amplitude (FWHM) of the point spread functions versus misfocus for the two systems. The FWHM barely changes for the FIG. 2 C-PM system, but rises rapidly for the FIG. 1 standard system.

Figure 17:
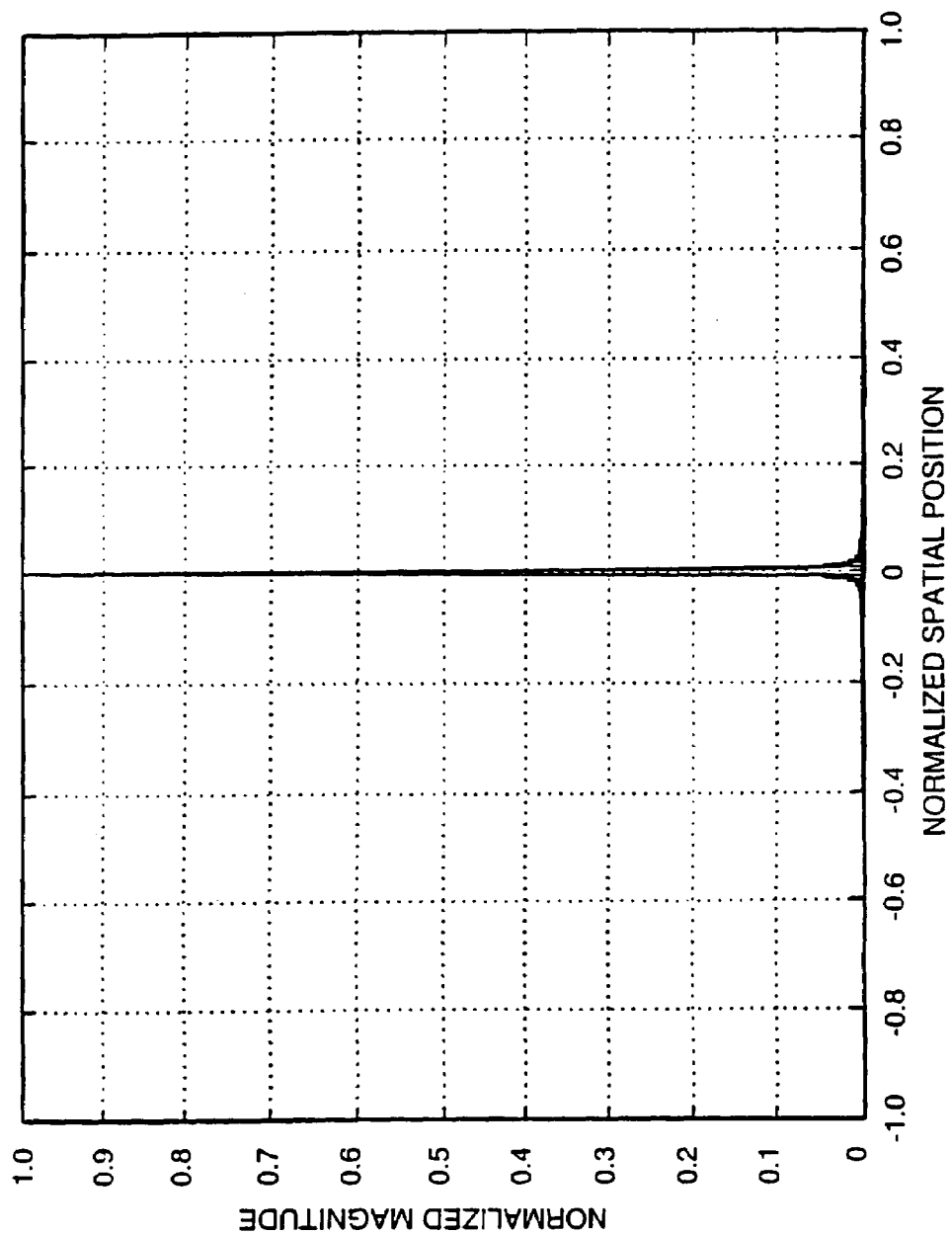
FIG. 17 shows the PSF of the standard imaging system of FIG. 1 with no misfocus.
Figure 18:
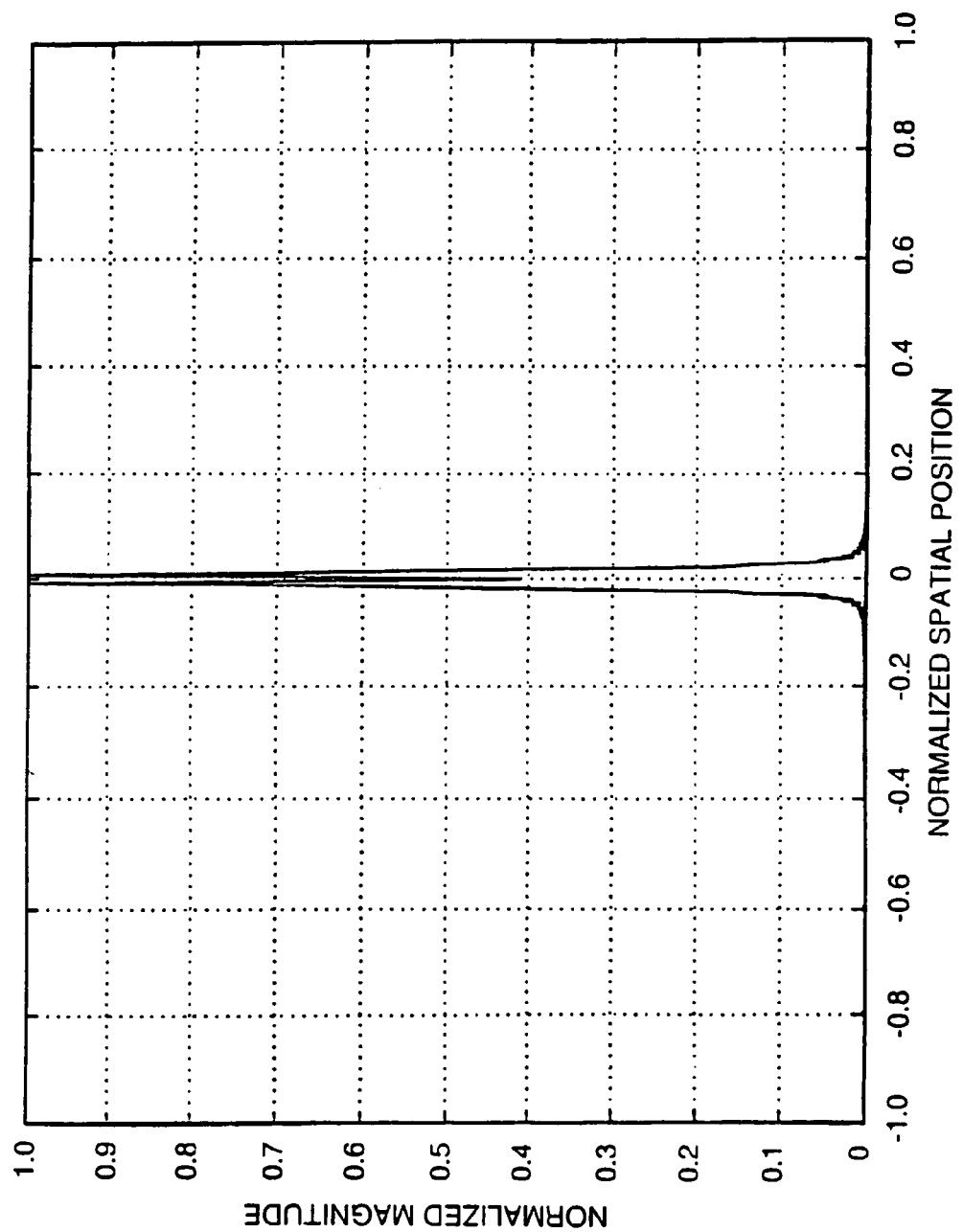
FIG. 18 shows the PSF of the standard system of FIG. 1 with mild misfocus.
Figure 19:
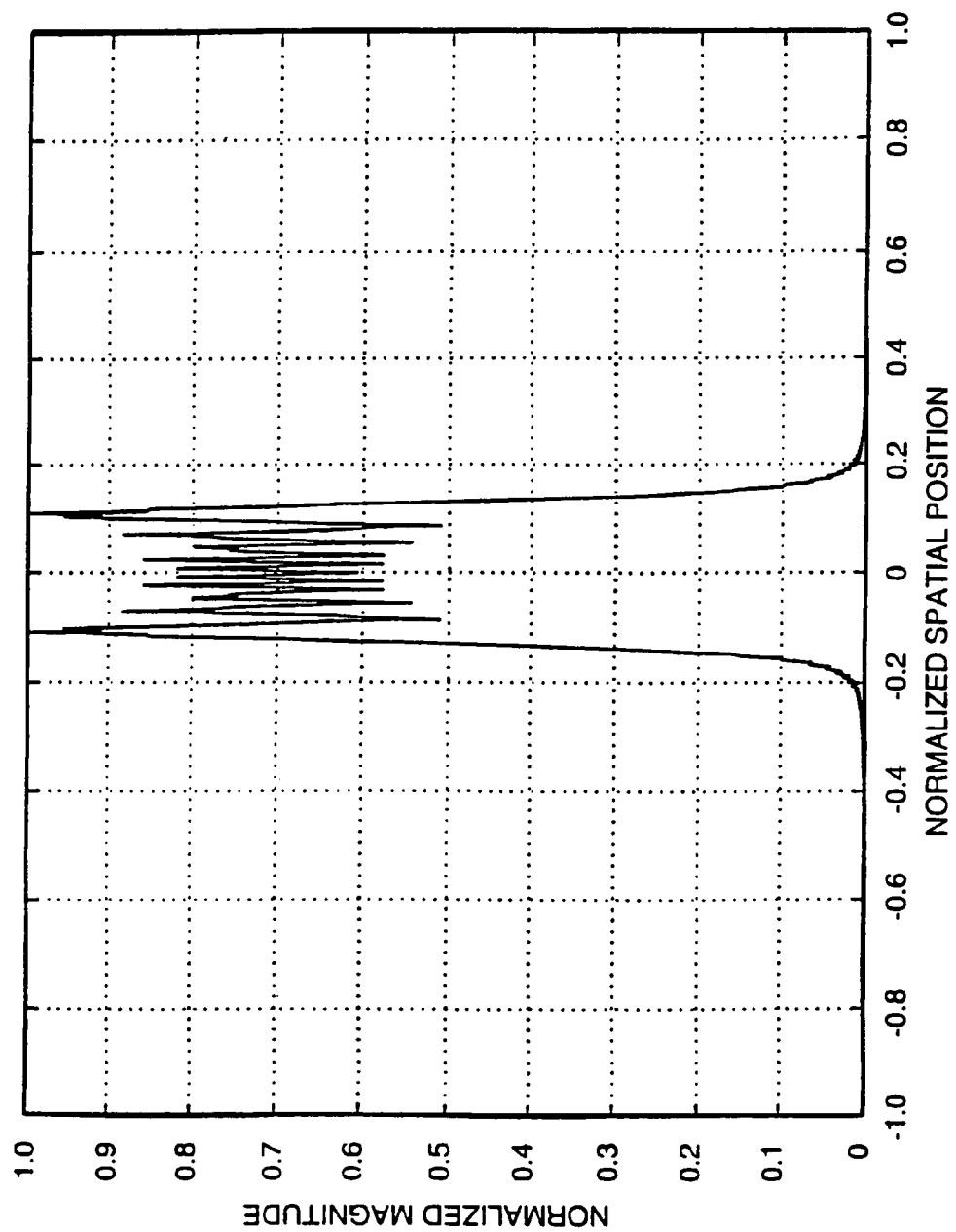
FIG. 19 shows the PSF of the standard system of FIG. 1 with large misfocus.

FIGS. 17, 18, and 19 show the PSFs associated with the FIG. 1 standard system for misfocus values of 0, 0.5, and 3, (no misfocus, mild misfocus, and large misfocus) respectively. The PSF changes dramatically even for mild misfocus, and is entirely unacceptable for large misfocus.

Figure 20:
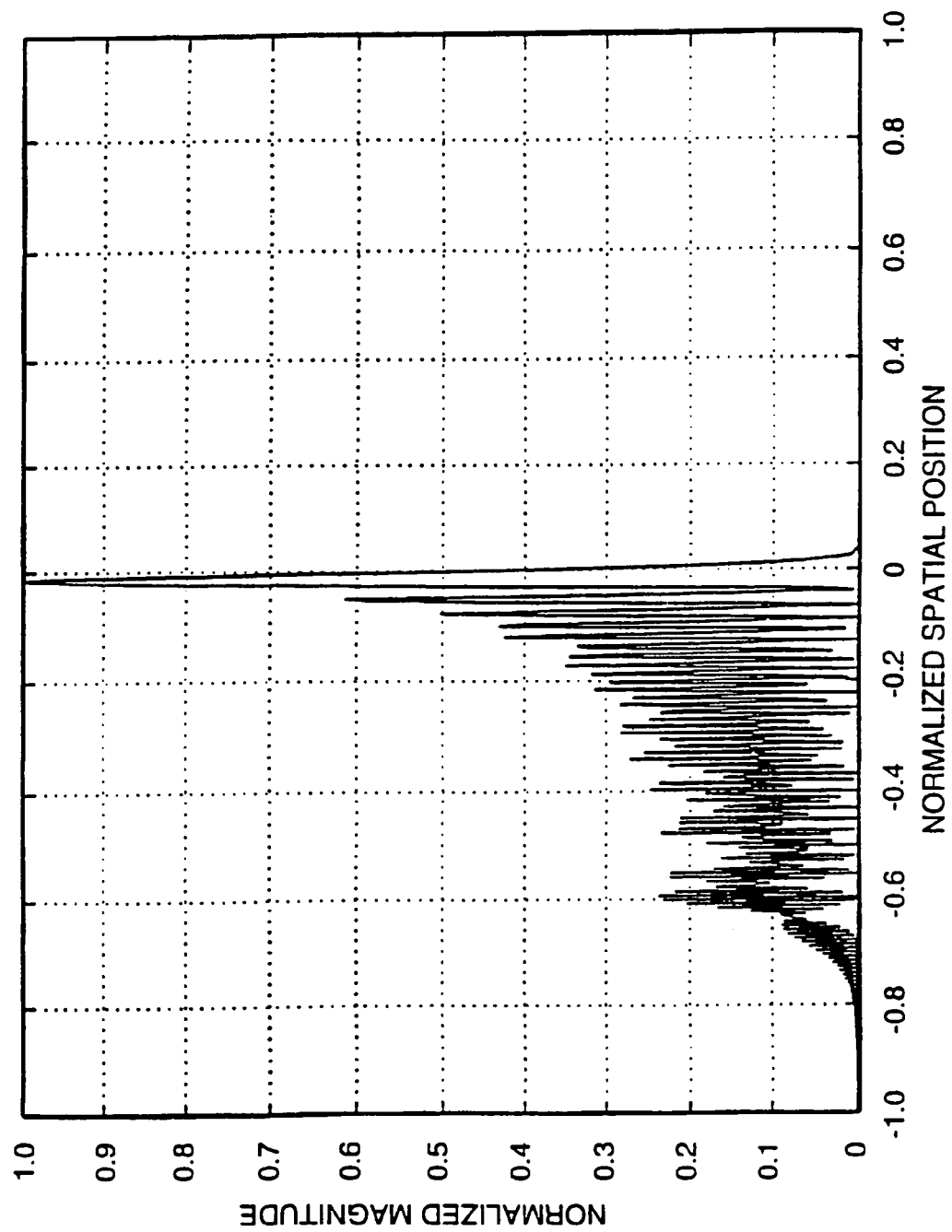
FIG. 20 shows the PSF of the C-PM system of FIG. 2 with no misfocus, before digital processing.
Figure 21:
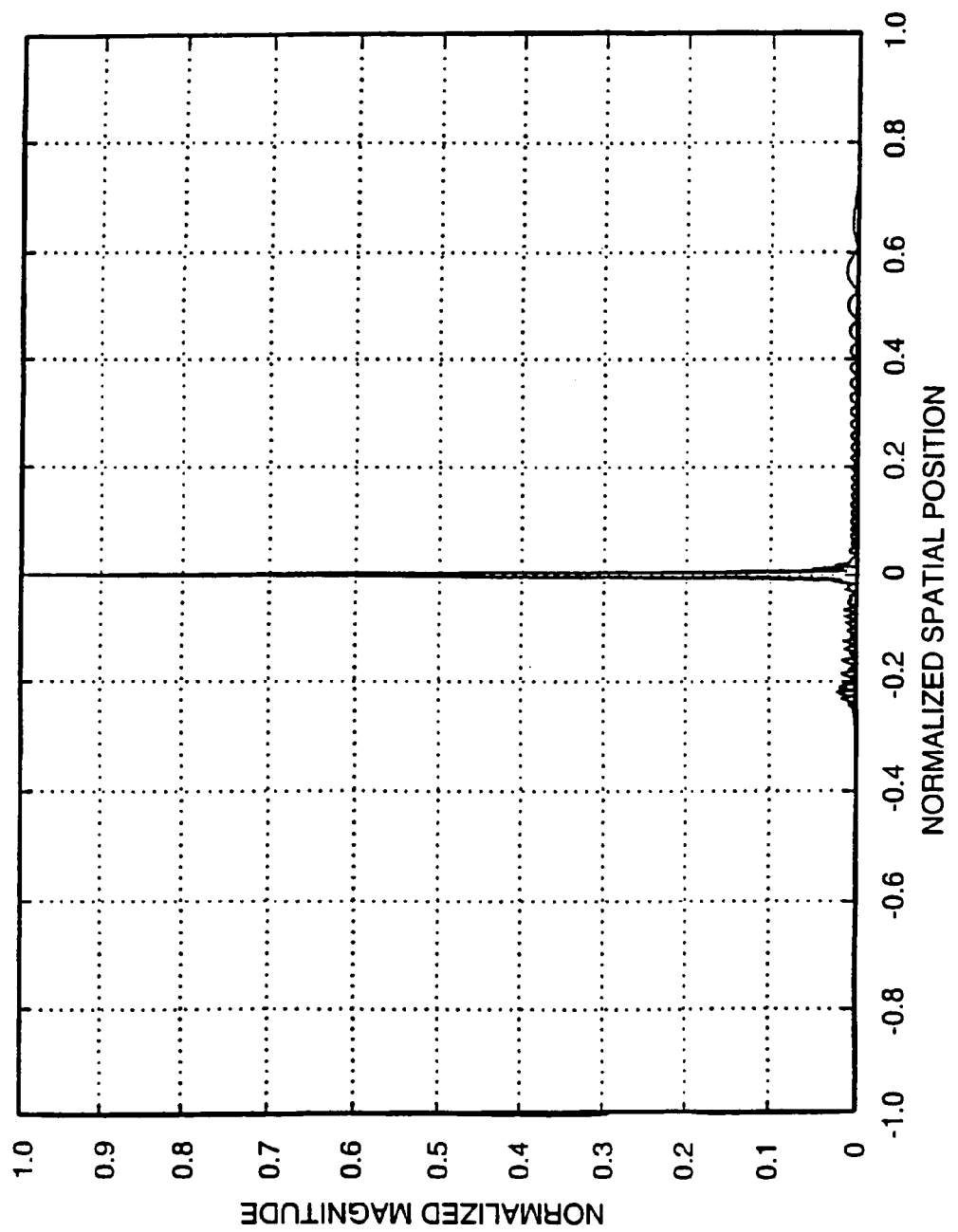
FIG. 21 shows the PSF of the C-PM system of FIG. 2 with no misfocus after processing.
Figure 22:
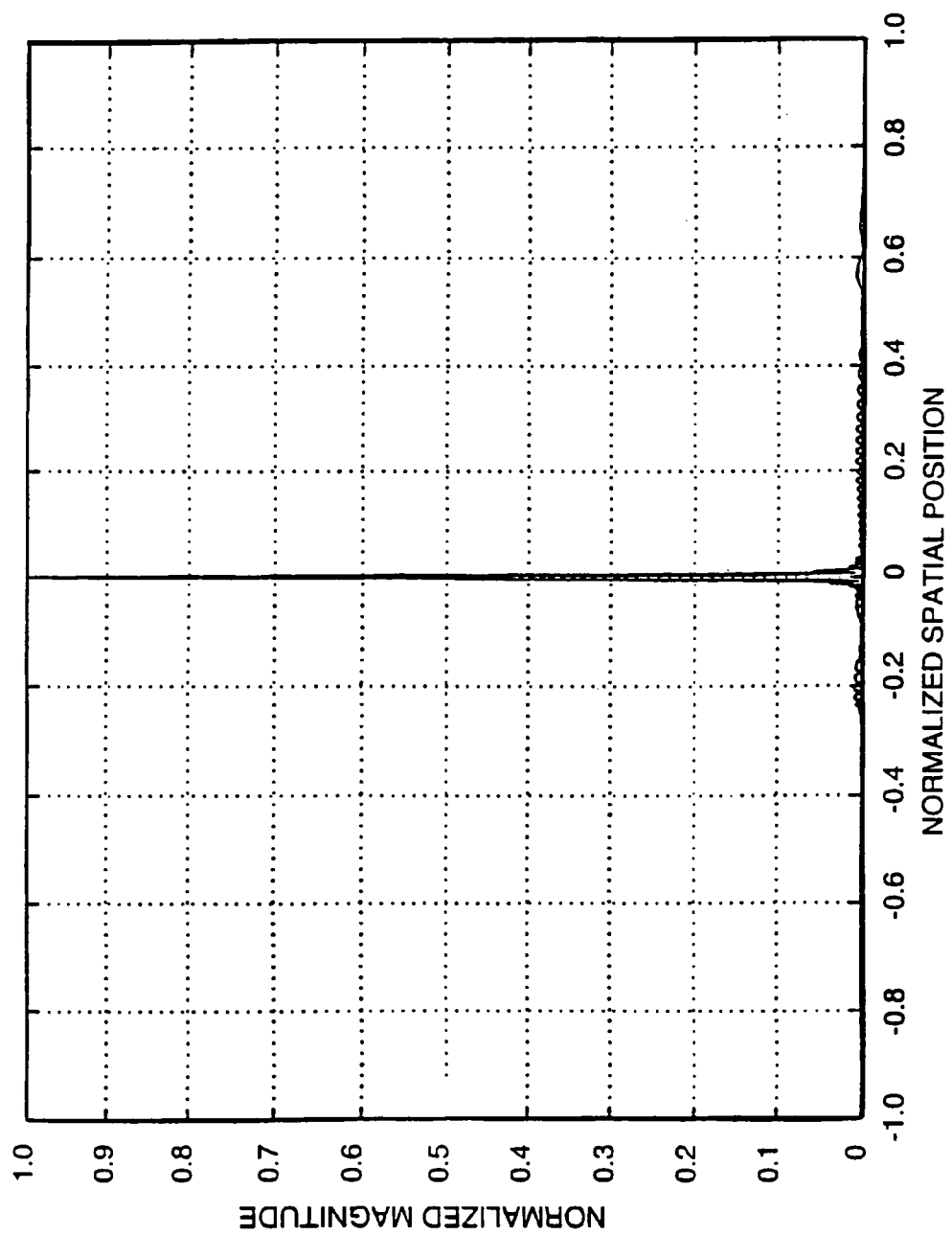
FIG. 22 shows the PSF of the C-PM system of FIG. 2 with small misfocus after processing.
Figure 23:
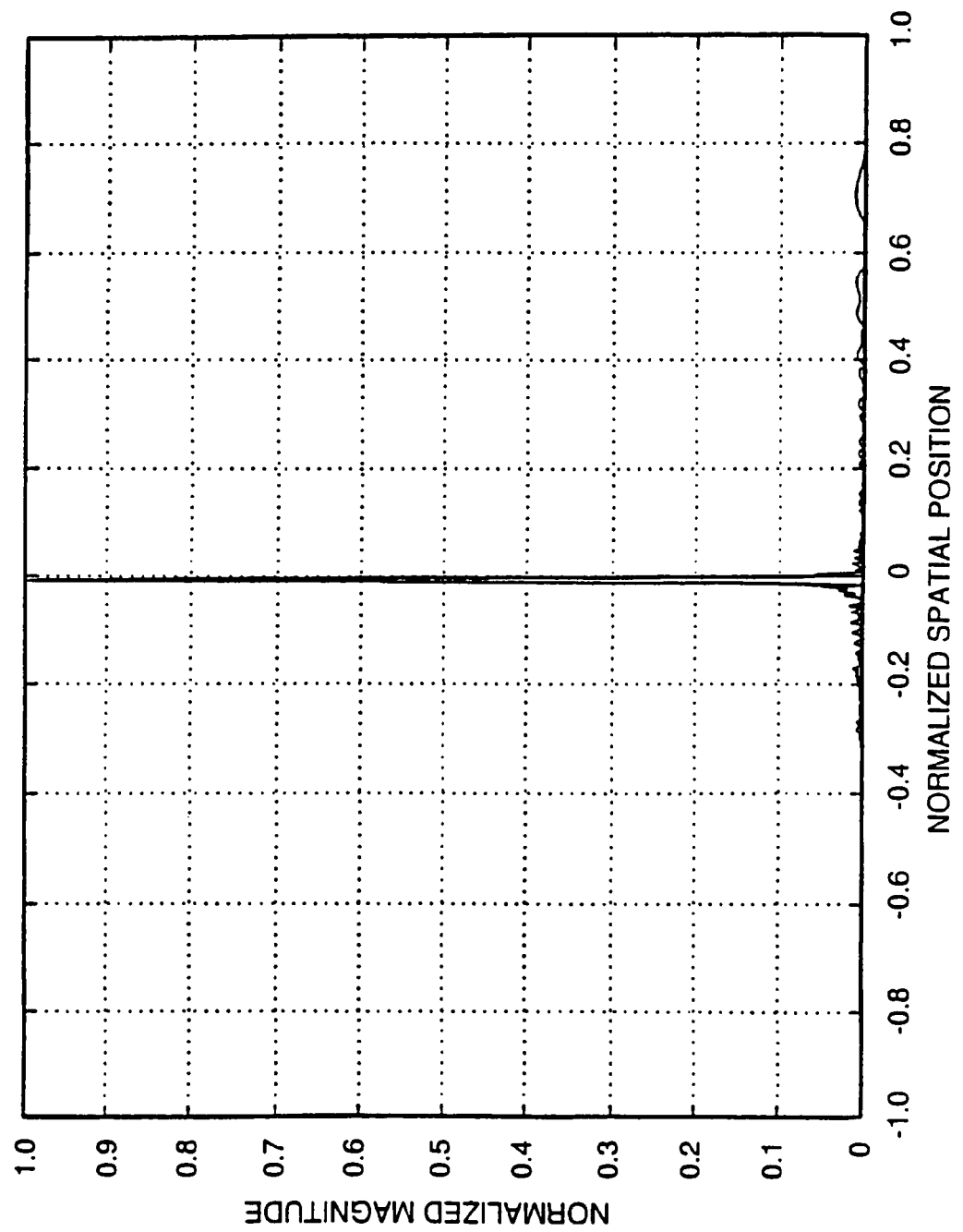
FIG. 23 shows the PSF of the C-PM system of FIG. 2 with large misfocus after processing.

FIG. 20 shows the PSF for the FIG. 2 C-PM system with no misfocus, before filtering (post-processing). It does not look at all like the ideal PSF of FIG. 17, but again, the PSF after filtering, shown in FIG. 21 does. The PSFs of the FIG. 2 C-PM system for mild misfocus is shown in FIG. 22, and the PSF for the FIG. 2 C-PM system with large misfocus is shown in FIG. 23. All three PSFs from the entire system are nearly indistinguishable from each other and from FIG. 17.

Figure 24:
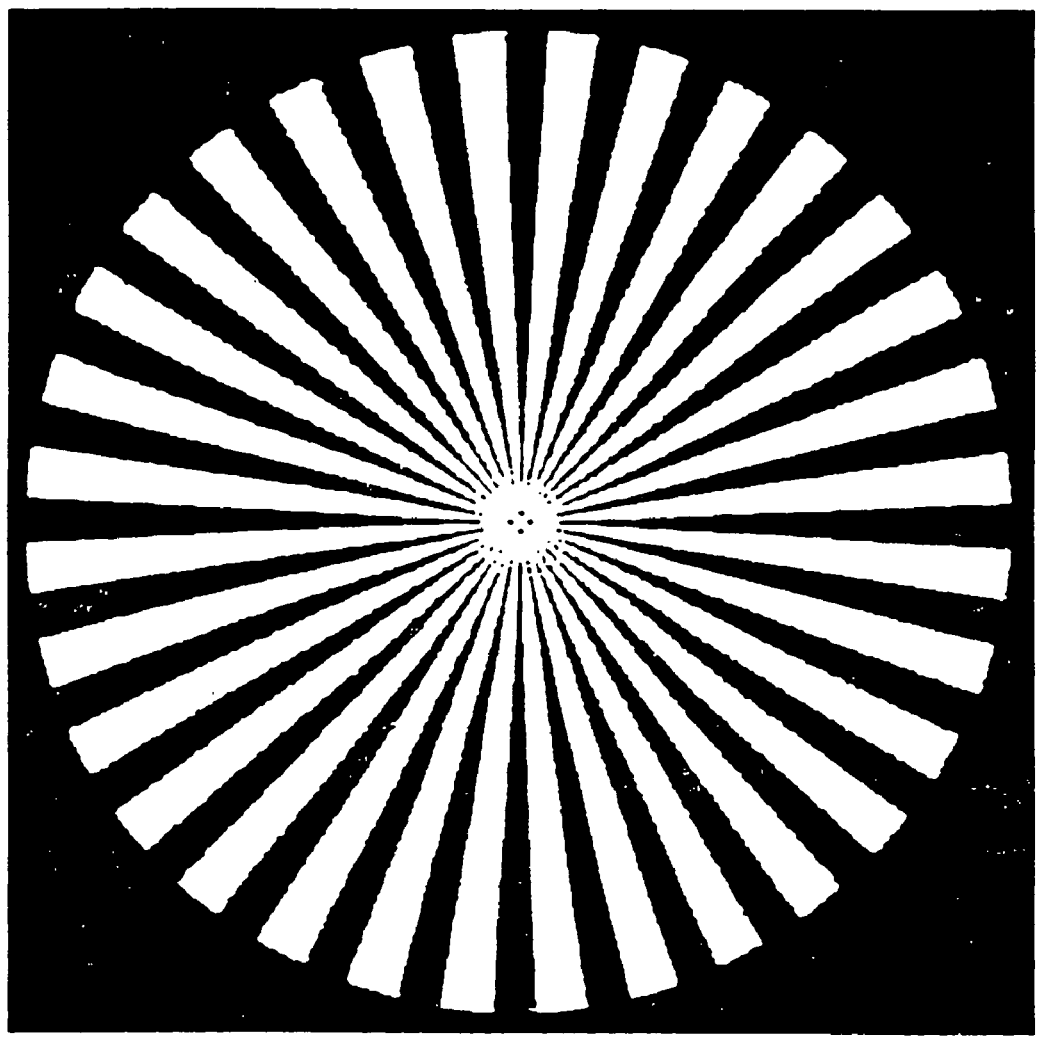
FIG. 24 shows a spoke image from the standard system of FIG. 1 with no misfocus.
Figure 25:
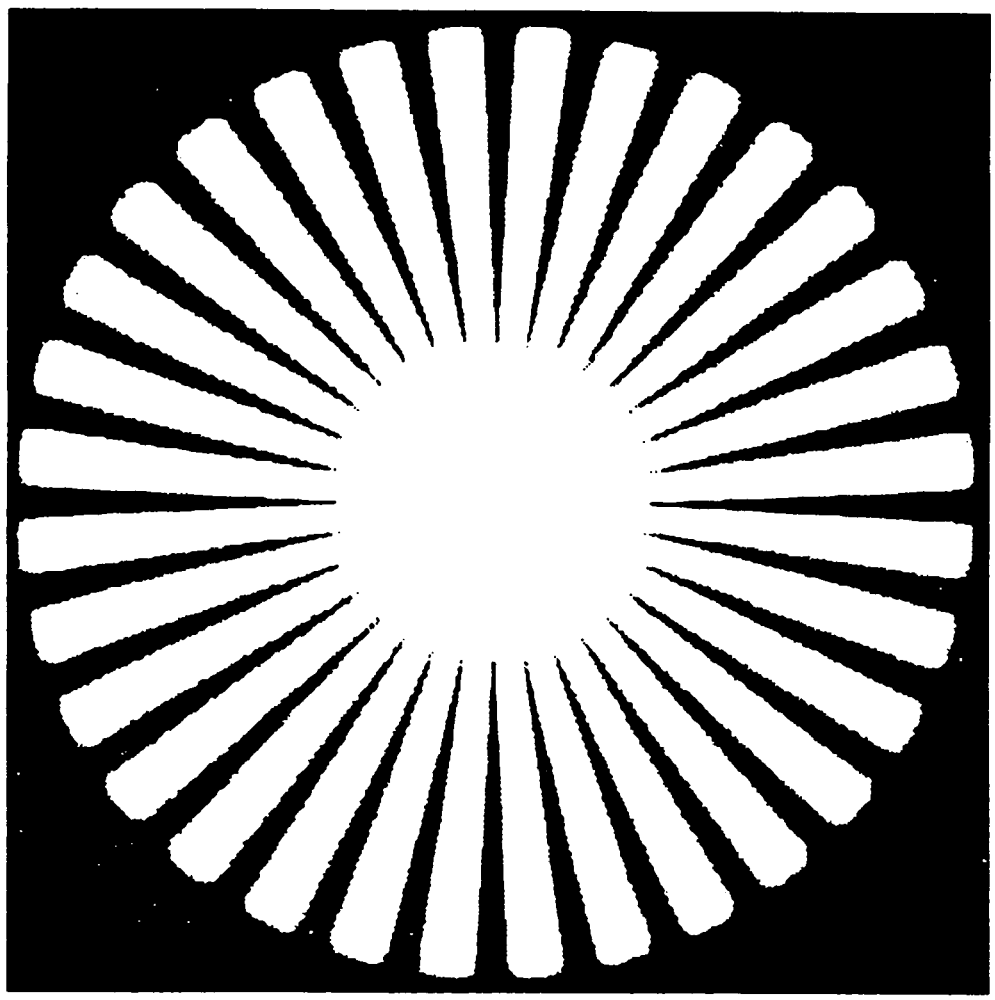
FIG. 25 shows a spoke image from the standard system of FIG. 1, with mild misfocus.
Figure 26:
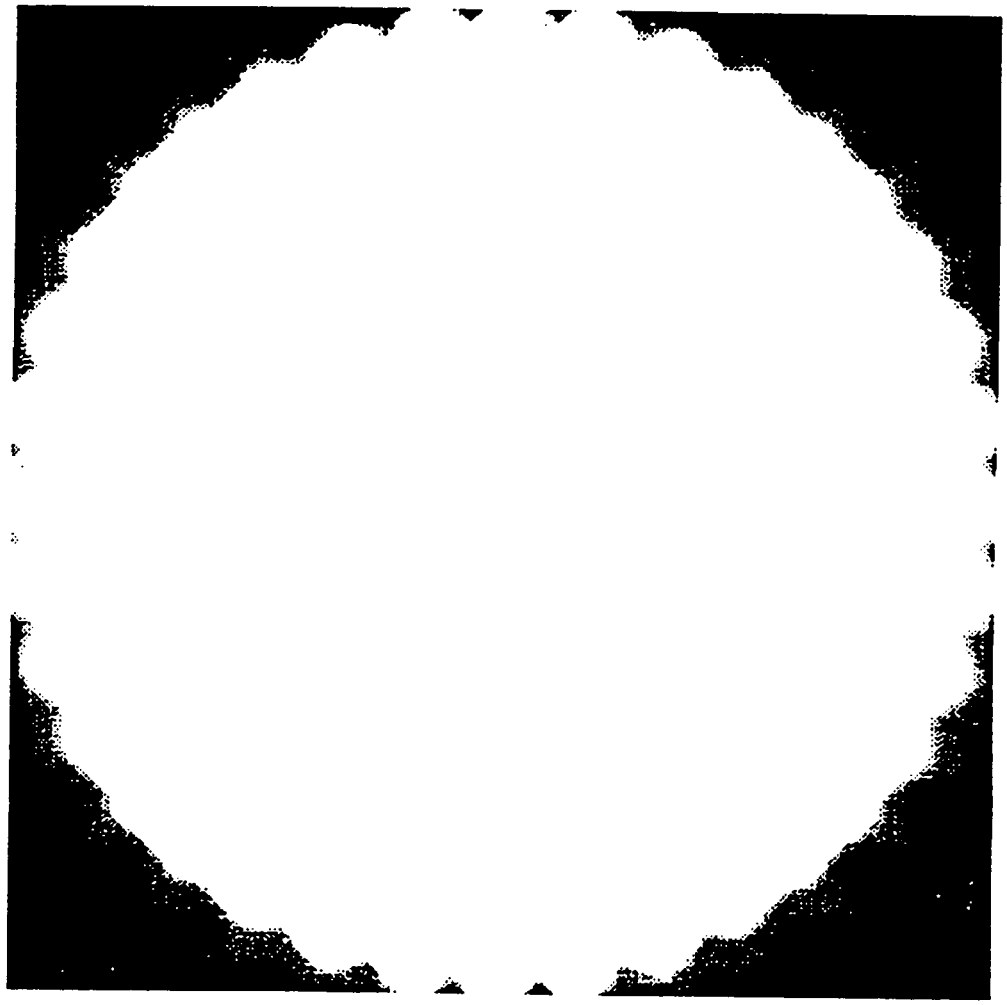
FIG. 26 shows a spoke image from the standard FIG. 1 system, with large misfocus.

FIG. 24 shows an image of a spoke picture formed by the FIG. 1 standard system with no misfocus. FIG. 25 shows an image of the same picture formed by the FIG. 1 standard system with mild misfocus. You can still discern the spokes, but the high frequency central portion of the picture is lost. FIG. 26 shows the FIG. 1 standard system image formed with large misfocus. Almost no information is carried by the image.

Figure 27:
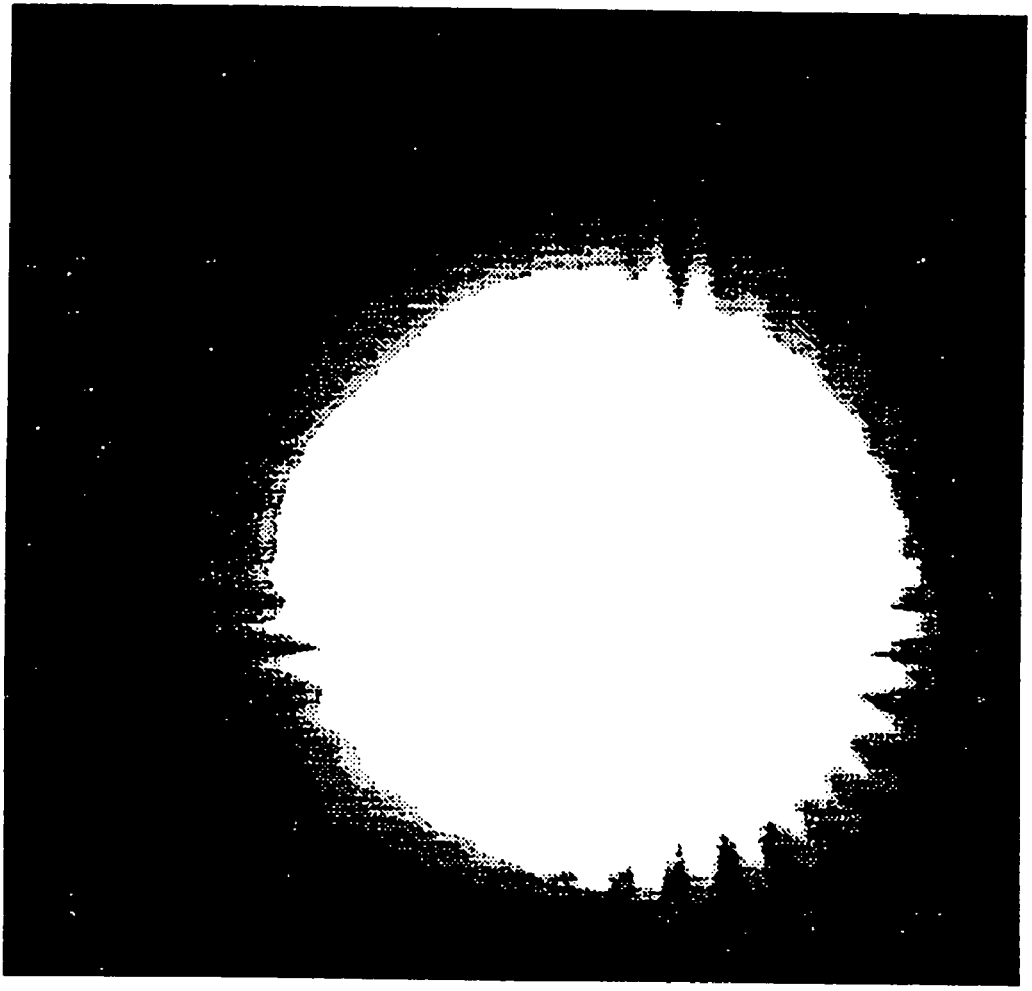
FIG. 27 shows a spoke image from the FIG. 2 C-PM system with no misfocus (before processing).
Figure 28:
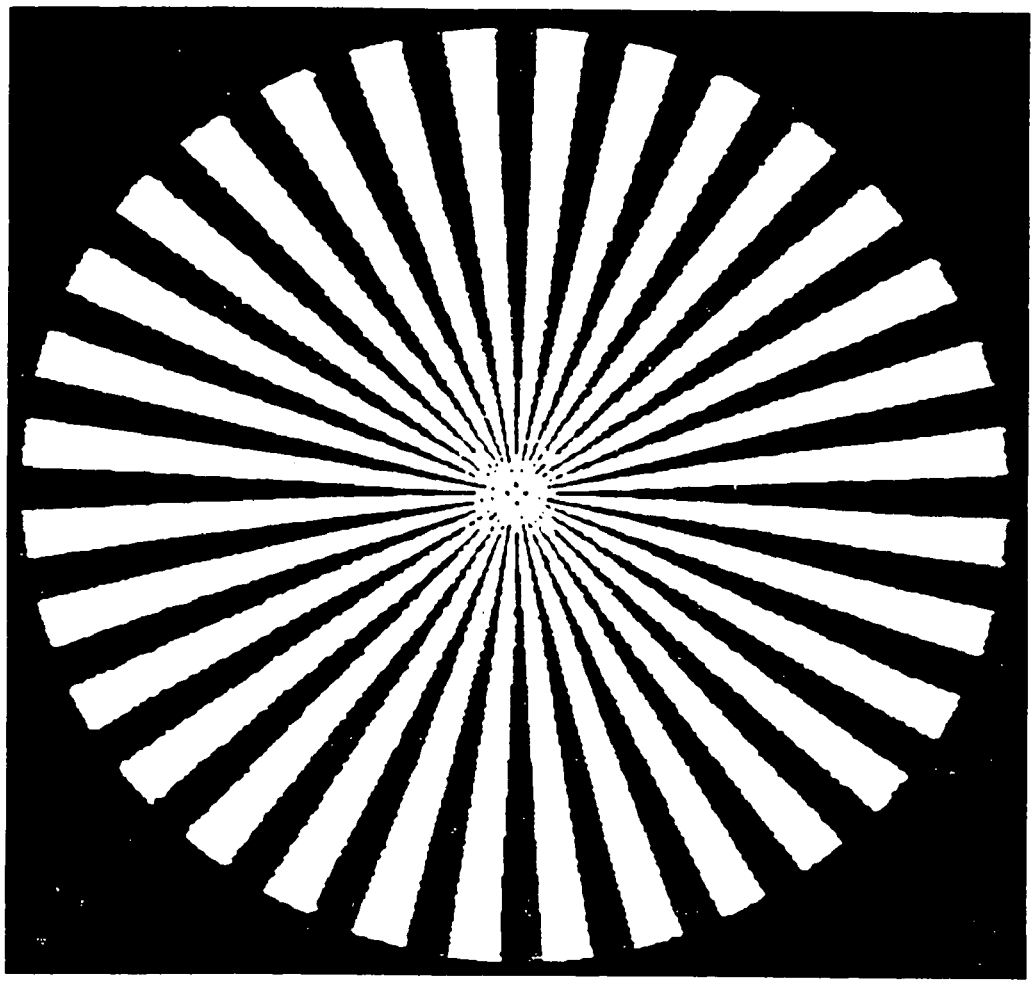
FIG. 28 shows a spoke image from the FIG. 2 C-PM system with no misfocus (after processing).
Figure 29:
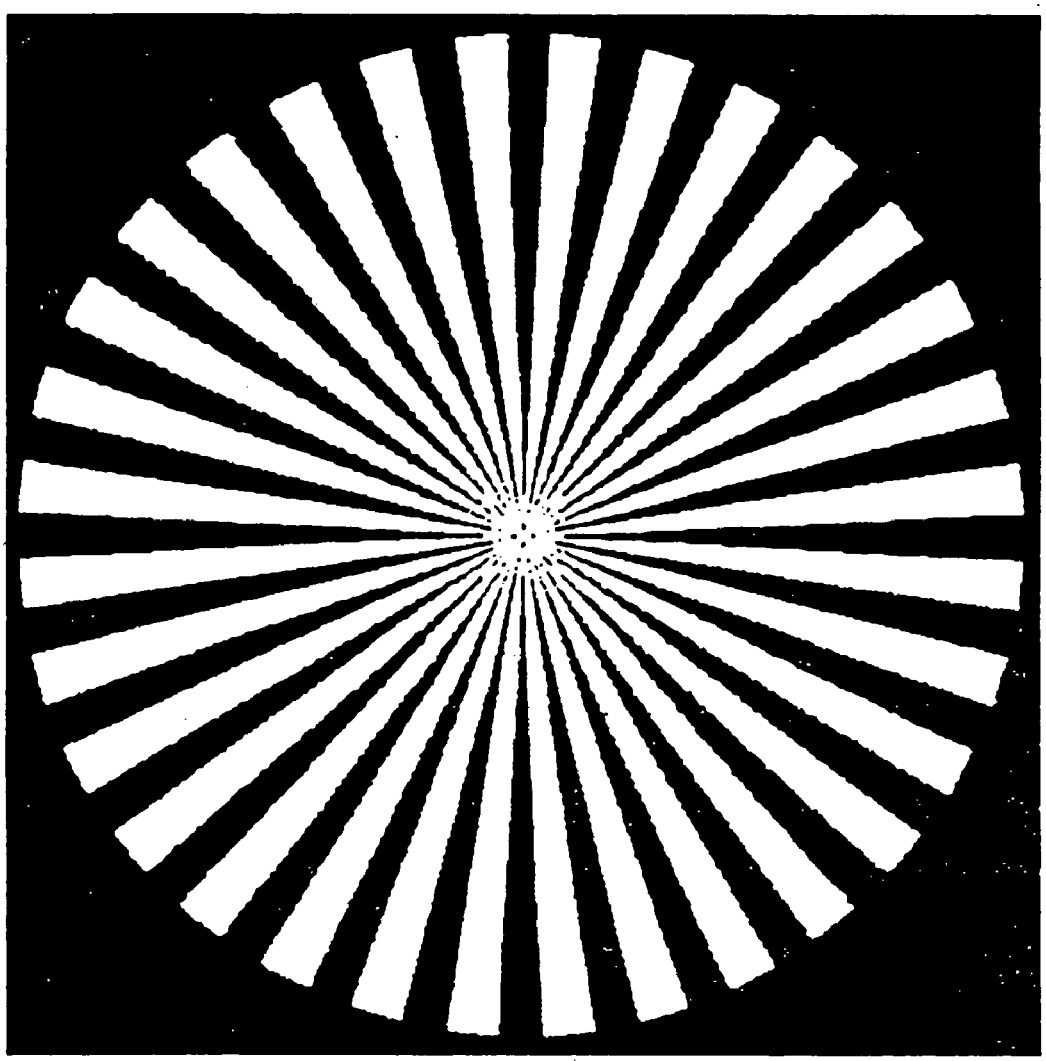
FIG. 29 shows a spoke image from the FIG. 2 C-PM system with mild misfocus (after processing).
Figure 30:
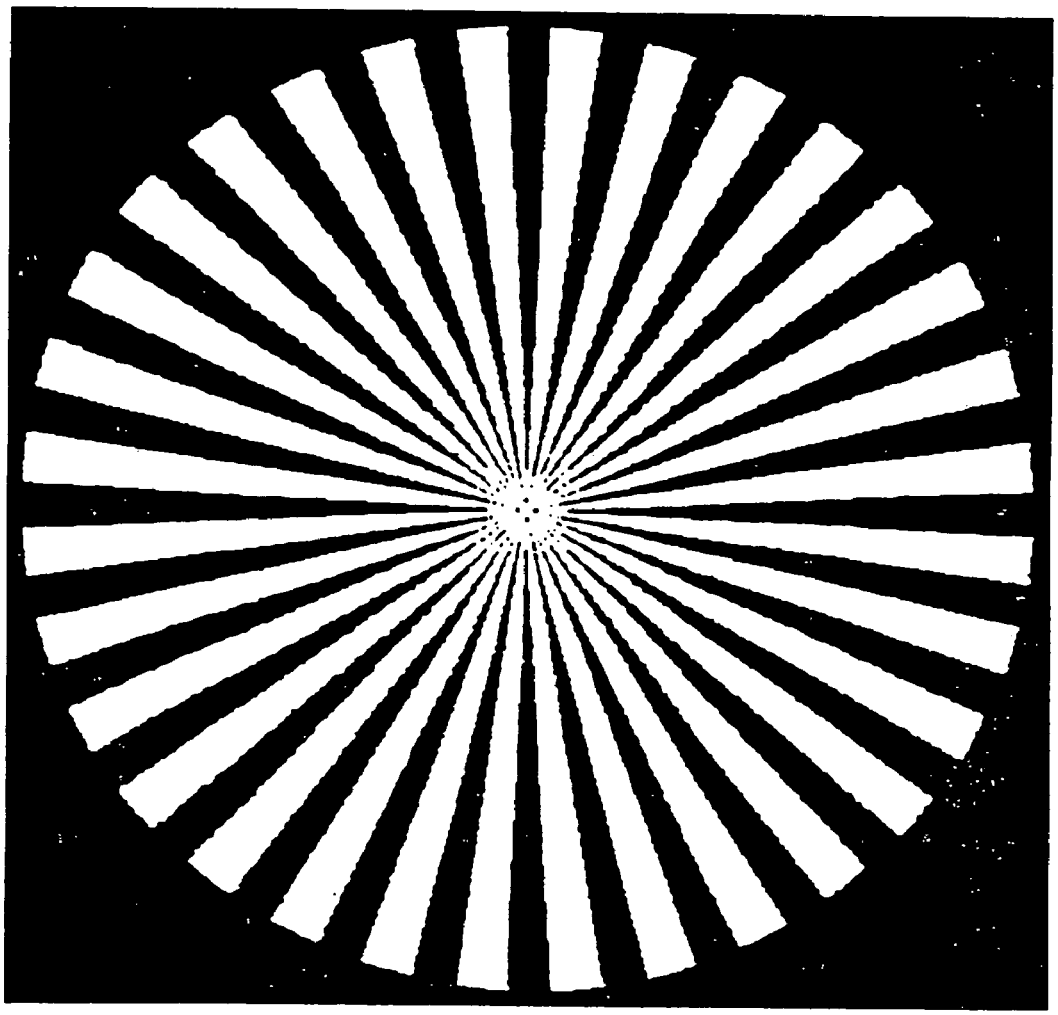
FIG. 30 shows a spoke image from the FIG. 2 C-PM system with large misfocus (after processing).

FIG. 27 is the image of the spoke picture formed by the FIG. 2 C-PM system, before digital processing. The image formed after processing is shown in FIG. 28. The images formed by the complete FIG. 2 system with mild and large misfocus are shown in FIGS. 29 and 30, respectively. Again, they are almost indistinguishable from each other, and from the ideal image of FIG. 24.

Figure 31:
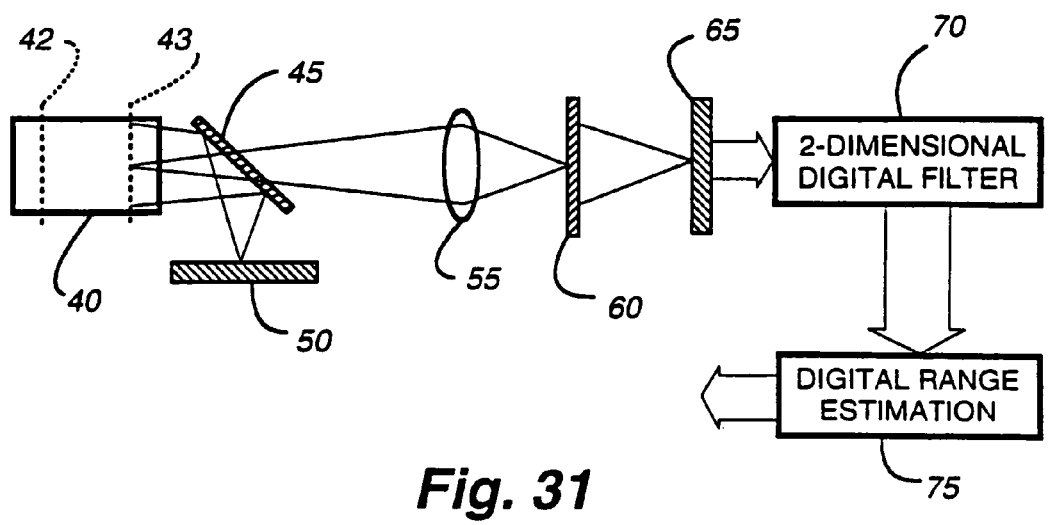
FIG. 31 shows an imaging system according to the present invention which combines extended depth of field capability with passive ranging.

FIG. 31 shows an optical system according to the present invention for extended depth of field passive ranging. Passive ranging using an optical mask is described in U.S. Pat. No. 5,521,695 entitled "Range Estimation Apparatus and Method" by the present inventors, herein incorporated by reference. U.S. Pat. No. 5,521,695 discusses systems containing range dependent null space, which is substantially similar to the range dependent zeroes discussed below.

In FIG. 31, general lens system 40 has entrance pupil 42 and exit pupil 43. Generally, optical mask 60 is placed at or near the aperture stop, but mask 60 may also be placed at the image of the aperture stop, as shown in FIG. 31. This allows beam splitter 45 to generate a clear image 50 of the object (not shown). Lens 55 projects an image of exit pupil 43 onto mask 60. Mask 60 is a combined extended depth of field and passive ranging mask. CCD 65 samples the image from mask 60. Digital filter 70 is a fixed digital filter matched to the extended depth of field component of mask 60. Filter 70 returns the PSF of the image to a point as described above. Range estimator 75 estimates the range to various points on the object (not shown) by estimating the period of the range-dependant nulls or zeroes.

Briefly, passive ranging is accomplished by modifying the incoherent optical system of FIG. 2 in such a way that range dependent zeroes are present in the Optical Transfer Function (OTF). Note that the OTF of the EDF system discussed above could not contain zeroes, because the zeroes cannot be removed by post filtering to restore the image. In FIG. 31, however, zeroes are added to encode the wavefront with range information. To find the range associated with small specific blocks of the image, the period of zeroes within a block is related to the range to the object imaged within the block. U.S. Pat. No. 5,521,695 primarily discusses amplitude masks, but phase masks can also produce an OTF with zeroes as a function of object range, and without loss of optical energy. Current passive ranging systems can only operate over a very limited object depth, beyond which it becomes impossible to locate the zeroes, because the OTF main lobe is narrowed, and the ranging zeroes get lost in the OTF lobe zeroes. Extending the depth of field of a passive ranging system makes such a system much more useful.

Consider a general mask 60 for passive ranging described mathematically as:

$$P(x) = \sum_{s=0}^{S-1} \mu_s(x-sT) e^{j\omega_s(x-sT)}, \; |x| \leq \pi/S \; \mu_s(x) = 0 \text{ for } |x| > \frac{\pi}{S}$$

Figure 32:
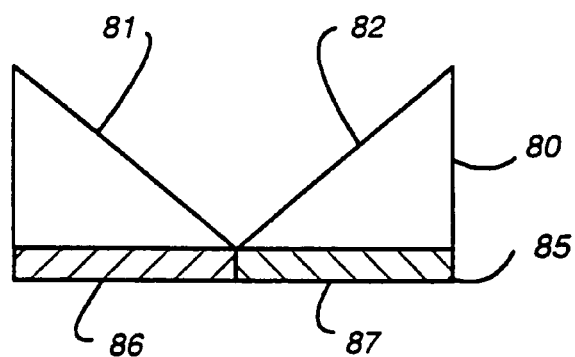
FIG. 32 shows a phase mask for passive ranging.

This mask is composed of S phase modulated elements $\mu_s(x)$ of length T, where $S \cdot T = 2\pi$. Phase modulation of each segment is given by the exponential terms. If the above mask is a phase mask then the segments $\mu_s(x)$, s=0, 1, ..., s−1, satisfy $|\mu_s(x)|=1$. A simple example of this type of mask is shown in FIG. 32. This is a two segment (S=2) phase mask where $\omega_0=-\pi/2$, and $\omega_1=-\pi/2$.

FIG. 32 shows an example of a phase passive ranging mask 80, which can be used as mask 60 of FIG. 31. This mask is called a Linear Phase Modulation (LPM) mask because each of the segments modulates phase linearly. Mask 80 comprises two wedges or prisms 81 and 82 with reversed orientation. Without optional filter 85, the formed image is the sum of the left and right components. Optional filter 85 comprises two halves 86 and 87, one under each wedge. Half 86 is orthogonal to half 87, in the sense that light which passes through one half will not pass through the other. For example, the filters could be different colors (such as red and green, green and blue, or blue and red), or could be polarized in perpendicular directions. The purpose of filter 85 is to allow single-lens stereograms to be produced. A stereogram is composed of two images that overlap, with the distance between the same point in each image being determined by the object range to that point.

Figure 33:
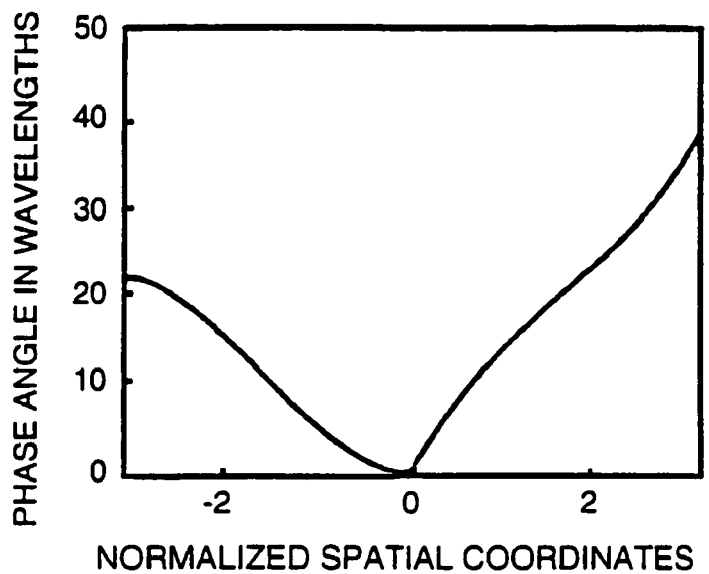
FIG. 33 shows a phase mask for extended depth of field and passive ranging, for use in the device of FIG. 31.

FIG. 33 shows the optical mask function of a combined LPM passive ranging mask and Cubic-PM mask 60 of FIG. 31 which is suitable for passive ranging over a large depth of field. This mask is described by:

$$P(x)=\mu(x)e^{j\alpha x^3}e^{j\omega_0 x}+\mu(x-\pi)e^{j\alpha(x-\pi)^3}e^{j\omega_1(x-\pi)},$$

where $\mu(x)=1$ for $0 \leq x \leq \pi$, 0 otherwise

By using two segments for the LPM component of mask 60, two lobes of the PSF will be produced.

Figure 34:
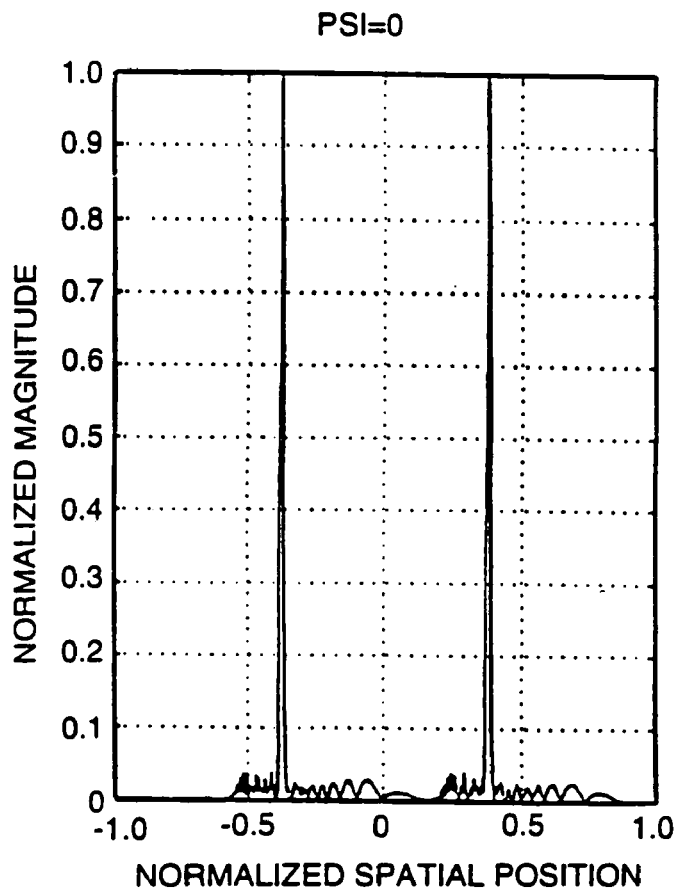
FIG. 34 shows the point spread function of the FIG. 31 embodiment with no misfocus.

The PSF of the imaging system of FIG. 31, using a mask 60 having the FIG. 33 characteristics, with misfocus $\psi=0$ (no misfocus), is shown in FIG. 34. This system will be called the EDF/PR system, for extended depth of field/passive ranging. The PSF has two peaks because of the two segments of mask 60.

Figure 35:
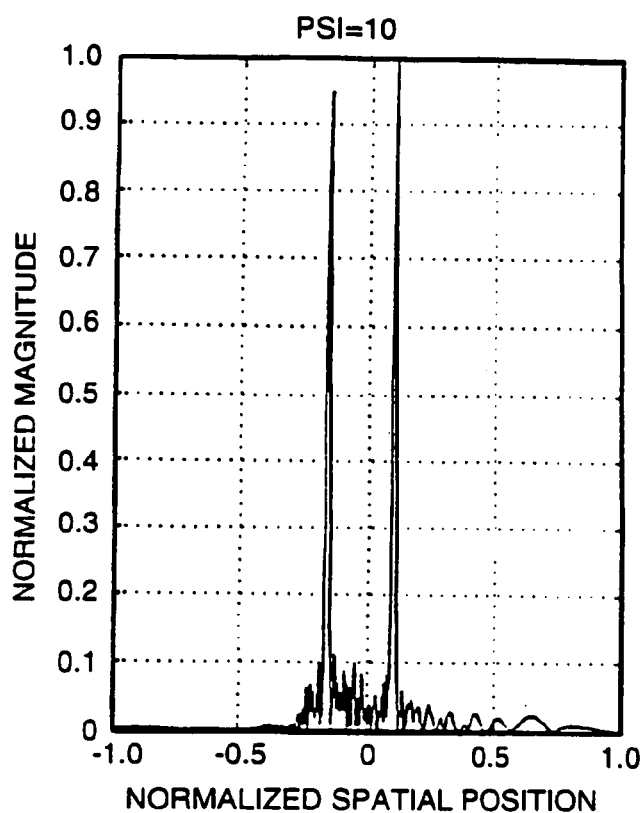
FIG. 35 shows the point spread function of the FIG. 31 embodiment with large positive misfocus.

FIG. 35 shows the PSF of the EDF/PR system with $\Psi=10$. The fact that $\Psi$ is positive indicates that the object is on the far side of the in-focus plane from the lens. The two peaks of the PSF have moved closer together. Thus, it can be seen that the misfocus (or distance from in-focus plane) is related to the distance between the peaks of the PSF. The actual processing done by digital range estimator 75 is, of course, considerably more complicated, since an entire scene is received by estimator 75, and not just the image of a point source. This processing is described in detail in U.S. Pat. No. 5,521,695.

Figure 36:
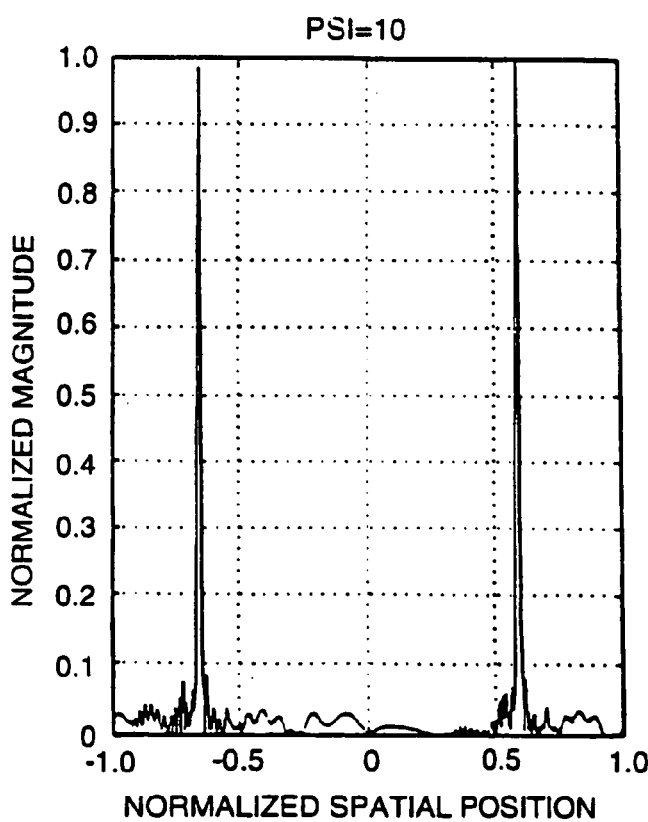
FIG. 36 shows the point spread function of the FIG. 31 embodiment with large negative misfocus.

FIG. 36 shows the PSF of the EDF/PR system with $\psi=-10$. The fact that $\psi$ is negative indicates that the object is nearer to the lens than is the in-focus plane. The two peaks of the PSF have moved farther apart. This allows estimator 75 to determine not only how far the object is from the in focus plane, but which direction.

It is important to note that while the distance between the peaks of the PSF varies with distance, the peaks themselves remain narrow and sharp because of the EDF portion of mask 60 combined with the operation of digital filter 70.

Figure 37:
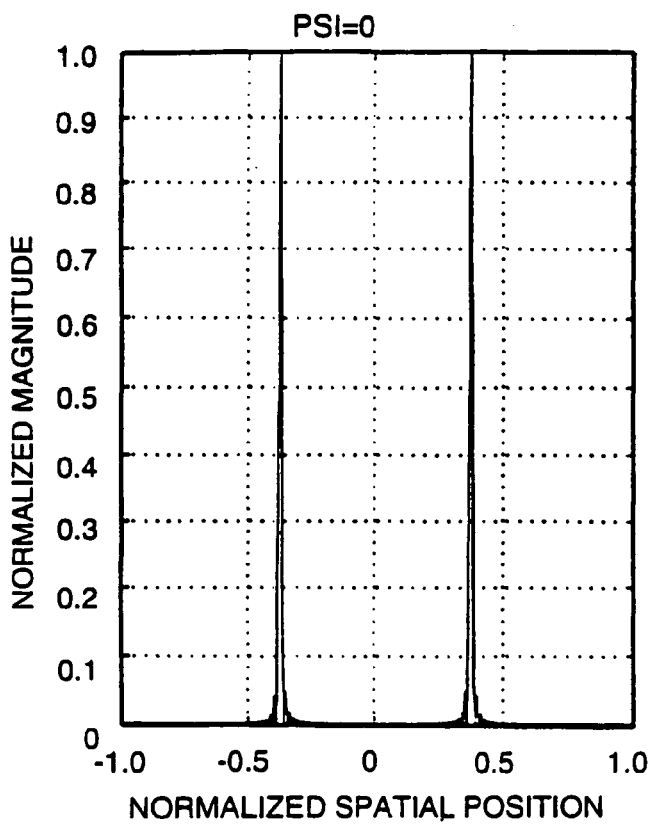
FIG. 37 shows the point spread function of the FIG. 31 embodiment with no extended depth of field capability and no misfocus.
Figure 38:
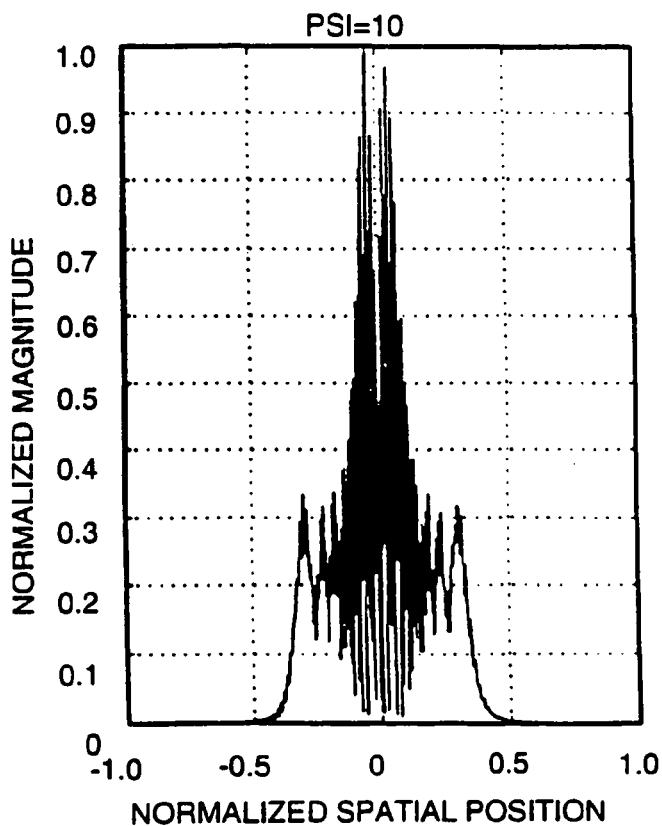
FIG. 38 shows the optical transfer function of the FIG. 31 embodiment with no extended depth of field capability and with large positive misfocus.
Figure 39:
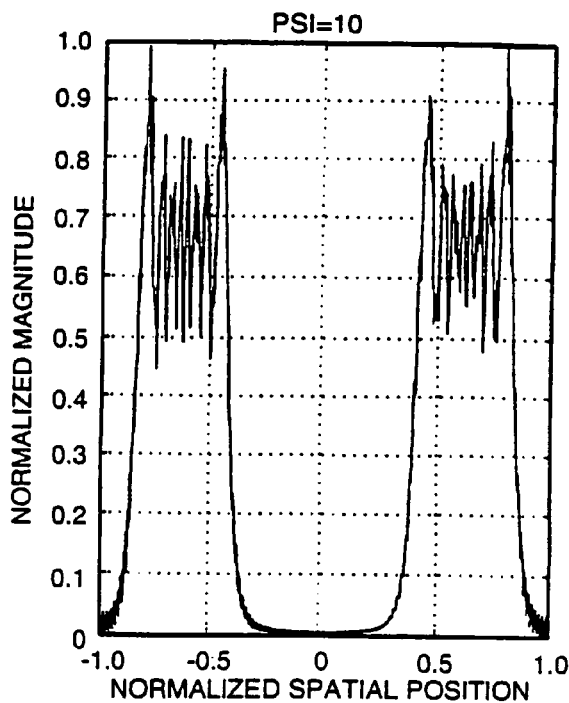
FIG. 39 shows the optical transfer function of the FIG. 31 embodiment with no extended depth of field capability and with large negative misfocus.

FIG. 37 shows the PSF of a system with an LPM mask 80 of FIG. 31, without the EDF portion, and with no misfocus. Since there is no misfocus, FIG. 37 is very similar to FIG. 34. FIG. 38 shows the PSF of mask 80 without EDF and with large positive misfocus ($\psi=10$). The peaks have moved together, as in FIG. 35. It would be very difficult, however, for any amount of digital processing to determine range from this PSF because the peaks are so broadened. FIG. 39 shows the PSF of mask 80 with no EDF and large negative misfocus ($\psi=-10$). The peaks have moved apart, but it would be difficult to determine by how much because of the large amount of misfocus.

That is, FIG. 39 shows the PSF of the LPM system without extended depth of field capability and with large negative misfocus ($\psi=-10$). The peaks have moved further apart, but again it would be very difficult to determine the location of the peaks.

Figure 40:
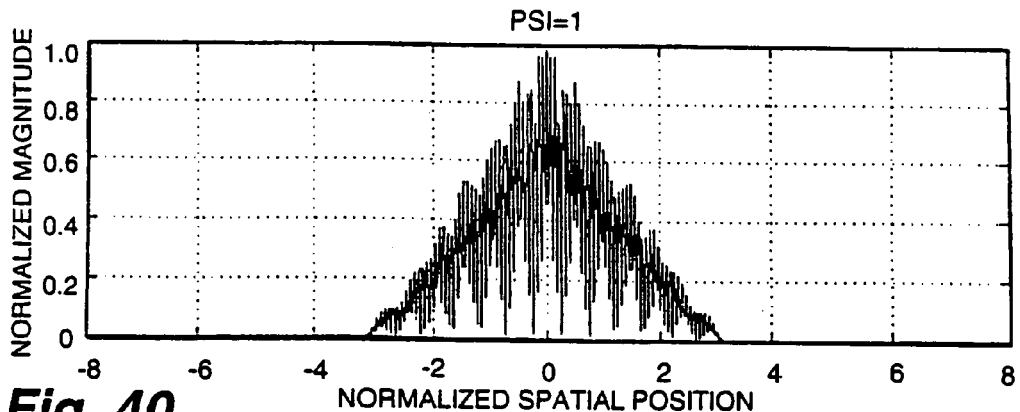
FIG. 40 shows the optical transfer function of the extended depth of field passive ranging system of FIG. 31 with a small amount of misfocus.

FIG. 40 shows the optical transfer function of the combined EDF and LPM system shown in FIG. 31, with a small amount of misfocus ($\psi=1$). The envelope of the OTF is essentially the triangle of the perfect system (shown in FIG. 6). The function added to the OTF by the ranging portion of the mask of FIG. 33 includes range dependent zeroes, or minima. The digital processing looks for these zeroes to determine the range to different points in the object.

Figure 41:
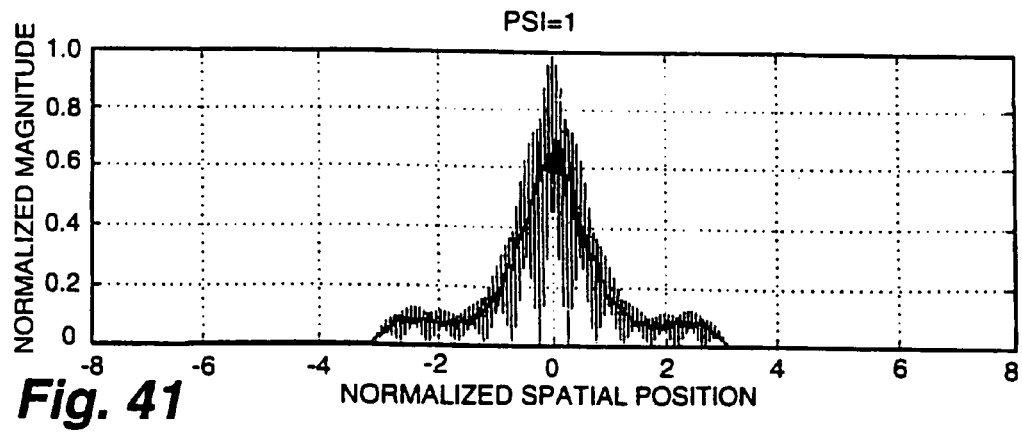
FIG. 41 shows the optical transfer function of a passive ranging system without extended depth of field capability and with a small amount of misfocus.

FIG. 41 shows the optical transfer function of the FIG. 31 embodiment with no extended depth of field capability and small misfocus ($\psi=1$). The envelope has moved from being the ideal triangle (shown in FIG. 6) to having a narrowed central lobe with side lobes. It is still possible to distinguish the range dependant zeroes, but it is becoming more difficult, because of the low value of the envelope between the main lobe and the side lobes. As the misfocus increases, the main lobe narrows and the envelope has low values over a larger area. The range-dependant minima and zeroes tend to blend in with the envelope zeroes to the extent that digital processing 70, 75 cannot reliably distinguish them.

Figure 42:
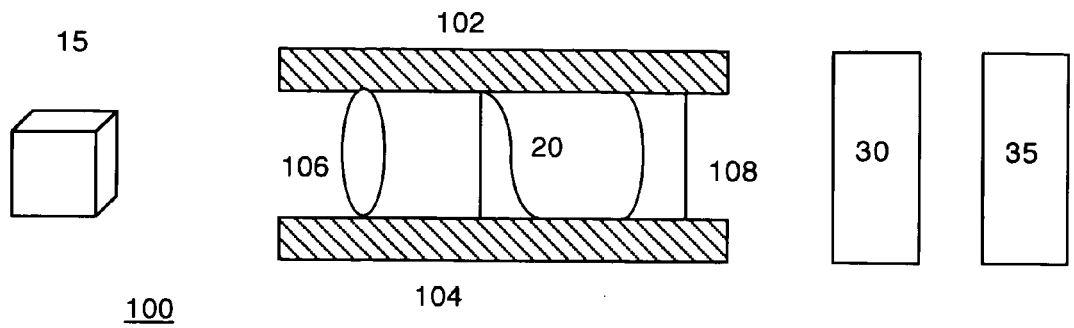
FIG. 42 shows an EDF imaging system similar to that of FIG. 2, with plastic optical elements used in place of the lens of FIG. 2.

FIG. 42 shows an optical system 100, similar to the imaging system of FIG. 2, but utilizing plastic optical elements 106 and 108 in place of lens 25. Optical elements 106, 108 are affixed using spacers 102, 104, which are intended to retain elements 106, 108 at a fixed location in the optical system, with a fixed spacing between elements 106, 108. All optical elements, and especially plastic elements, are subject to changes in geometry as well as changes in index of refraction with variations in temperature. For example, PMMA, a popular plastic for optical elements, has an index of refraction that changes with temperature 60 times faster than that of glass. In addition, spacers 102 and 104 will change in dimension with temperature, growing slightly longer as temperature increases. This causes elements 106, 108 to move apart as temperature increases.

Thus, changes in temperature result in changes in the performance of optical systems like system 100. In particular, the image plane of an optical system like system 100 will move with temperature. EDF mask 20, combined with digital processing 35, increases the depth of field of system 100, reducing the impact of this temperature effect. In FIG. 42, mask 20 is located between elements 102 and 104, but mask 20 may also be located elsewhere in the optical system.

EDF mask 20 (combined with processing 35) also reduces the impact of chromatic aberrations caused by elements 106, 108. Plastic optical elements are especially prone to chromatic aberrations, due to the limited number of different plastics that have good optical properties. Common methods of reducing chromatic aberrations, such as combining two elements having different indices of refraction, are usually not available. Thus, the increase of depth of field provided by the EDF elements 20, 35, is particularly important in systems including plastic elements.

Figure 43:
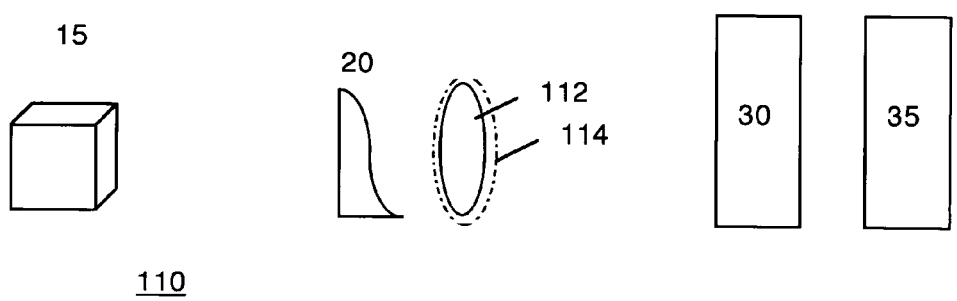
FIG. 43 shows an EDF imaging system similar to that of FIG. 2, with an infrared lens used in place of the lens of FIG. 2.

FIG. 43 shows an infrared lens 112 used in place of lens 25 in the imaging system of FIG. 2. Dotted line 114 shows the dimensions of lens 112 at an increased temperature. Infrared materials such as Germanium are especially prone to thermal effects such as changes in dimension and changes in index of refraction with changes in temperature. The change in index of refraction with temperature is 230 times that of glass. EDF filter 20 and processing 35 increase the depth of field of optical system 110, reducing the impact of these thermal effects.

Like plastic optical elements, infrared optical elements are more prone to chromatic aberration than glass elements. It is especially difficult to reduce chromatic aberration in infrared elements, due to the limited number of infrared materials available. Common methods of reducing chromatic aberrations, such as combining two elements having different indices of refraction, are usually not available. Thus, the increase in depth of field provided by the EDF elements is particularly important in infrared systems.

Figure 44:
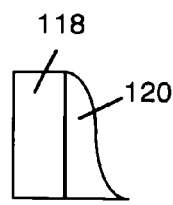
FIG. 44 shows a color filter joined with the EDF mask of FIG. 3.

FIG. 44 shows a color filter 118 joined with EDF mask 20. In some optical systems it is desirable to process or image only one wavelength of light, e.g. red light. In other systems a grey filter may be used. In systems utilizing a color filter, EDF mask 120 may be affixed to the color filter or formed integrally with the color filter of a single material, to form a single element.

Figure 45:
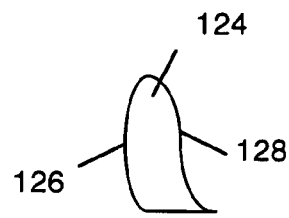
FIG. 45 shows a combined lens/EDF mask according to the present invention.

FIG. 45 shows a combined lens/EDF mask 124 (the EDF mask is not to scale). This element could replace lens 25 and mask 20 of the imaging system of FIG. 2, for example. In this particular example, the mask and the lens are formed integrally. A first surface 126 implements the focussing function, and a second surface 128 also implements the EDF mask function. Those skilled in the art will appreciate that these two functions could be accomplished with a variety of mask shapes.

Figure 46:
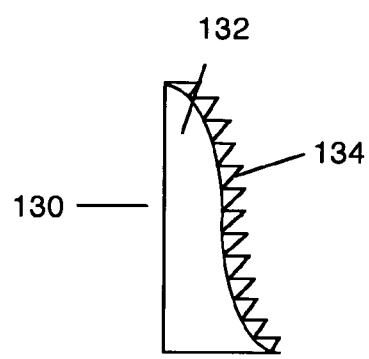
FIG. 46 shows a combined diffractive grating/EDF mask according to the present invention.

FIG. 46 shows a combined diffractive grating/EDF mask 130. Grating 134 could be added to EDF mask 132 via an embossing process, for example. Grating 134 may comprise a modulated grating, e.g. to compensate for chromatic aberration, or it might comprise a diffractive optical element functioning as a lens or as an antialiasing filter.

Figure 47:
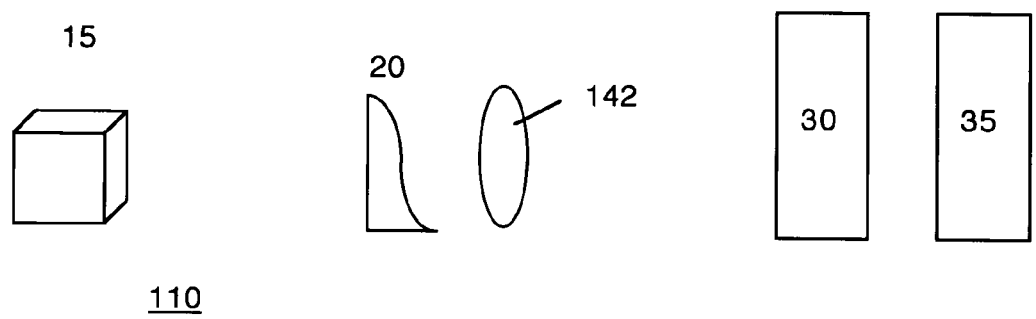
FIG. 47 shows and EDF optical system similar to that of FIG. 2, the lens having misfocus aberrations.

FIG. 47 shows an EDF optical system similar to that of FIG. 2, wherein lens 142 exhibits misfocus aberrations. Misfocus aberrations include astigmatism, which occurs when vertical and horizontal lines focus in different planes, spherical aberration, which occurs when radial zones of the lens focus at different planes, and field curvature, which occurs when off-axis field points focus on a curved surface. Mask 20, in conjunction with post processing 35 extend the depth of field of the optical system, which reduces the effect of these misfocus aberrations.

Figure 48:
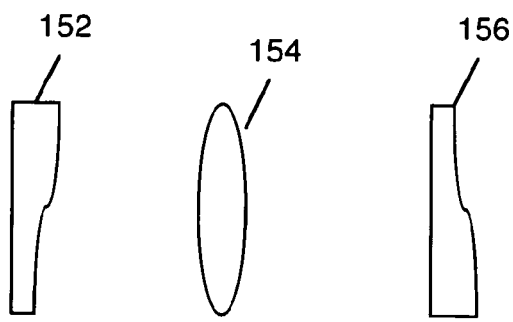
FIG. 48 shows an EDF optical system utilizing two masks in different locations in the system which combine to perform the EDF function, according to the present invention.

FIG. 48 shows an optical system 150 utilizing two masks 152, 156 in different locations in the system, which combine to perform the EDF mask function of mask 20. This might be useful to implement vertical variations in mask 152 and horizontal variations in mask 156, for example. In the particular example of FIG. 48, masks 152, 156 are arrayed on either side of lens 154. This assembly could replace lens 25 and mask 20 in the imaging system of FIG. 2, for example.

Figure 49:
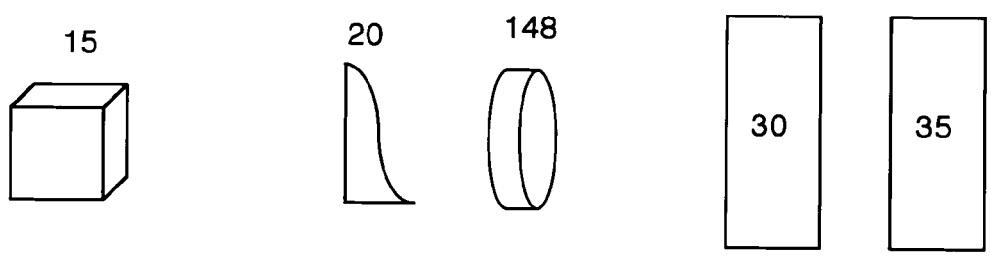
FIG. 49 shows an EDF imaging system similar to that of FIG. 2, with a self focussing fiber used in place of the lens of FIG. 2.

FIG. 49 shows an optical imaging system like that of FIG. 2, with lens 25 replaced by a self focussing element 162. Element 162 focuses light not by changes in the thickness of the optical material across the cross section of the element (such as the shape of a lens), but rather by changes in the index of refraction of the material across the cross section of the element.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. An optical system for increasing a depth of field, the optical system characterized at least by an ambiguity function and a point spread function (PSF), which ambiguity function is a function of a normalized spatial frequency parameter u and a vertical variable v related to a misfocus parameter ψ, and which PSF is at least a function of the misfocus parameter ψ, the optical system comprising:
   a plastic element configured for imaging light from an object to form an image, the light including at least phase and amplitude and the plastic element being configured to maintain the amplitude of light passing through the plastic element;
   a mask optically connected with the plastic element and configured for altering the phase of the light while maintaining the amplitude of the light passing through the mask such that a main lobe of the ambiguity function is broader in v for a given value of u over an optical bandpass of the imaging system, and the PSF has a functionally different form for a given value of ψ, in comparison to a main lobe of an ambiguity function, a PSF and the optical bandpass, respectively, characterizing the optical system without the mask for those given values of u and ψ, over a range of object distances between the object and the plastic element; and
   a signal processor configured for removing from the image, in accordance with the PSF, an imaging effect induced by the altering of the phase by the mask.

2. The optical system of claim 1, wherein the mask comprises a phase plate configured for effecting a phase modulation of the light.

3. The optical system of claim 2, wherein the phase modulation comprises a selected one of a linear phase modulation and a cubic phase modulation.

4. The optical system of claim 1, further comprising a storing arrangement optically connected with the mask for storing the image.

5. The optical system of claim 4, wherein the signal processor comprises a filter connected with the storing arrangement for removing the imaging effect.

6. In an optical system for imaging light from an object to form an image, which light is characterized at least by phase and amplitude, and which optical system is characterized at least by an ambiguity function and a point spread function (PSF), which ambiguity function is a function of a normalized spatial frequency parameter u and a vertical variable v related to a misfocus parameter ψ, and which PSF is at least a function of the misfocus parameter ψ, an improvement for increasing a depth of field of the optical system, the improvement comprising:
   an optical mask, configured for altering the phase while maintaining the amplitude of the light transmitted therethrough such that a main lobe of the ambiguity function is broader in v for a given value of u over an optical bandpass of the imaging system, and the PSF has a functionally different form for a given value of ψ, in comparison to a main lobe of an ambiguity function, a PSF and the optical bandpass, respectively, characterizing the optical system without the optical mask for those given values of u and ψ, over a range of object distances between the object and the optical system; and
   a signal processor configured for removing from the image, in accordance with the PSF, an imaging effect induced by the altering of the phase by the optical mask to render an in-focus electronic image over the range of object distances.

7. In the optical system of claim 6, the further improvement wherein the mask comprises a phase plate configured for effecting a phase modulation of the light.

8. In the optical system of claim 7, the further improvement wherein the phase modulation comprises a selected one of a linear phase modulation and a cubic phase modulation.

9. In the optical system of claim 6, the further improvement comprising a storing arrangement optically connected with the optical mask for storing the image.

10. In the optical system of claim 9, the further improvement wherein the signal processor comprises a filter connected with the storing arrangement for removing the imaging effect.

\* \* \* \* \*